United States Patent
Shi et al.

(10) Patent No.: US 10,461,904 B2
(45) Date of Patent: Oct. 29, 2019

(54) METHOD, APPARATUS, AND DEVICE FOR DETERMINING MODULATION AND CODING ORDER

(71) Applicant: Huawei Technologies Co., Ltd., Shenzhen (CN)

(72) Inventors: Dai Shi, Shanghai (CN); Wenting Guo, Shanghai (CN); Lei Lu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 111 days.

(21) Appl. No.: 15/600,525

(22) Filed: May 19, 2017

(65) Prior Publication Data

US 2017/0257204 A1    Sep. 7, 2017

Related U.S. Application Data

(63) Continuation of application No. PCT/CN2014/091901, filed on Nov. 21, 2014.

(51) Int. Cl.
| | |
|---|---|
| H04W 4/00 | (2018.01) |
| H04L 5/00 | (2006.01) |
| H04B 7/06 | (2006.01) |
| H04J 11/00 | (2006.01) |
| H04W 72/04 | (2009.01) |
| H04W 88/08 | (2009.01) |

(52) U.S. Cl.
CPC ............. *H04L 5/0048* (2013.01); *H04B 7/06* (2013.01); *H04J 11/0053* (2013.01); *H04L 5/0003* (2013.01); *H04L 5/0035* (2013.01); *H04L 5/0094* (2013.01); *H04W 72/042* (2013.01); *H04W 88/08* (2013.01)

(58) Field of Classification Search
None
See application file for complete search history.

(56) References Cited

U.S. PATENT DOCUMENTS

| | | |
|---|---|---|
| 2006/0093024 A1 | 5/2006 | Pietraski et al. |
| 2008/0165875 A1 | 7/2008 | Mundarath et al. |

(Continued)

FOREIGN PATENT DOCUMENTS

| | | |
|---|---|---|
| CN | 1385983 A | 12/2002 |
| CN | 1567759 A | 1/2005 |

(Continued)

*Primary Examiner* — Bob A Phynkulh
(74) *Attorney, Agent, or Firm* — Leydig, Voit & Mayer, Ltd.

(57) ABSTRACT

A method for determining a modulation and coding scheme is disclosed. The method is performed by a network device. The method includes: determining a quantity K of terminal devices that reuse a first time-frequency resource in a first time period to receive downlink data from the network device, where K≥2; obtaining a channel quality indicator (CQI), where the CQI is determined according to a signal to interference plus noise ratio (SINR) of a channel and the quantity K of the terminal devices, where the channel is a channel based on the first time-frequency resource, and the channel is used to transmit downlink data between a first terminal device and the network device in the first time period; and determining a Modulation and Coding scheme (MCS) of the first terminal device according to the CQI.

19 Claims, 12 Drawing Sheets

200

Determine a quantity K of terminal devices that reuse a first time-frequency resource in a first time period to perform downlink data transmission with the network device, where K≥2 — S210

Obtain a channel quality indicator CQI, where the CQI is determined according to a signal-to-noise ratio SINR of a channel and the quantity K of the terminal devices, where the channel is a channel based on the first time-frequency resource, and the channel is used to transmit downlink data between a first terminal device and the network device in the first time period — S220

Determine a modulation and coding order MCS of the first terminal device according to the CQI — S230

(56) References Cited

U.S. PATENT DOCUMENTS

| | | |
|---|---|---|
| 2010/0157916 A1 | 6/2010 | Kim et al. |
| 2010/0272011 A1* | 10/2010 | Palanki .................. H04L 1/005 370/328 |
| 2011/0135033 A1* | 6/2011 | Ko ....................... H04B 7/0413 375/295 |
| 2012/0069833 A1* | 3/2012 | Molnar ................ H04B 7/0626 370/342 |
| 2012/0314676 A1 | 12/2012 | Koo et al. |
| 2013/0114762 A1 | 5/2013 | Azadet et al. |
| 2014/0126467 A1* | 5/2014 | Lu ........................... H04L 1/003 370/328 |
| 2014/0269627 A1* | 9/2014 | Gorokhov ......... H04W 72/0446 370/336 |
| 2015/0288477 A1 | 10/2015 | Xu et al. |
| 2016/0277087 A1* | 9/2016 | Jo ........................ H04B 7/0617 |
| 2017/0048881 A1* | 2/2017 | Goria ................ H04W 72/1226 |

FOREIGN PATENT DOCUMENTS

| | | |
|---|---|---|
| CN | 101124832 A | 2/2008 |
| CN | 101141157 A | 3/2008 |
| CN | 101247163 A | 8/2008 |
| CN | 101359915 A | 2/2009 |
| CN | 101572948 A | 11/2009 |
| CN | 102138287 A | 7/2011 |
| CN | 102196495 A | 9/2011 |
| CN | 102769485 A | 11/2012 |
| CN | 102868496 A | 1/2013 |
| CN | 103023568 A | 4/2013 |
| CN | 103051430 A | 4/2013 |
| CN | 103139120 A | 6/2013 |
| CN | 103475455 A | 12/2013 |
| KR | 20110097570 A | 8/2011 |
| RU | 2432689 C2 | 10/2011 |
| WO | 2010031470 A1 | 3/2010 |

* cited by examiner

Determine a quantity K of terminal devices that reuse a first time-frequency resource in a first time period to perform downlink data transmission with the network device, where K≥2 — S510

Receive first indicator information sent by the first terminal device, where the first indicator information is used to indicate a channel quality indicator CQI, the CQI is determined by the first terminal device according to an SINR of a channel, the channel is a channel based on the first time-frequency resource, and the channel is used to transmit downlink data between the first terminal device and the network device in the first time period — S520

Determine, according to preset mapping relationship information, a modulation and coding order MCS corresponding to a value of the quantity K of the terminal devices and a value of the CQI, and use the MCS as an MCS of the first terminal device, where the mapping relationship information is used to indicate a one-to-one mapping relationship between N parameter sets and N MCSs, each parameter set includes a terminal device quantity value and a CQI value, and N≥2 — S530

FIG. 5

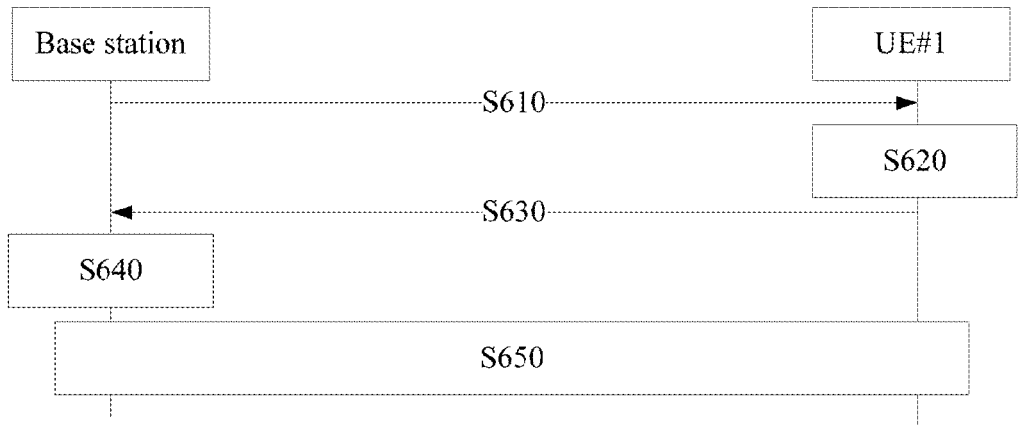

Determine a signal-to-noise ratio SINR of a channel, where the channel is a channel based on a first time-frequency resource, the channel is used to transmit downlink data between the first terminal device and a network device in a first time period, the K terminal devices reuse the first time-frequency resource in the first time period to perform downlink data transmission with the network device, and K≥2 — S710

Receive first indicator information sent by the network device, where the first indicator information is used to indicate the quantity K of the terminal devices — S720

Determine a channel quality indicator CQI according to the signal-to-noise ratio SINR of the channel and the quantity K of the terminal devices — S730

Send second indicator information to the network device, where the second indicator information is used to indicate the CQI, so that the network device determines a modulation and coding order MCS of the first terminal device according to the CQI — S740

Determine a signal-to-noise ratio SINR of a channel, where
the channel is a channel based on a first time-frequency
resource, the channel is used to transmit downlink data
between the first terminal device and a network device in a
first time period, the K terminal devices reuse the first time-
frequency resource in the first time period to perform downlink
data transmission with the network device, and K≥2 ⟶ S810

Determine a channel quality indicator CQI according to the
SINR of the channel ⟶ S820

Send first indicator information and second indicator
information to the network device, where the first indicator
information is used to indicate the CQI, and the second
indicator information is used to indicate a first decoding
iteration count, where the first decoding iteration count is a
count of decoding iterations performed when the first
terminal device performs decoding processing on the
downlink data, so that the network device determines a
modulation and coding order MCS of the first terminal device
according to the quantity K of the terminal devices, the CQI,
and the first decoding iteration count ⟶ S830

FIG. 8

METHOD, APPARATUS, AND DEVICE FOR DETERMINING MODULATION AND CODING ORDER

CROSS-REFERENCE TO RELATED APPLICATIONS

This application is a continuation of International Patent Application No. PCT/CN2014/091901, filed on Nov. 21, 2014, the disclosure of which is hereby incorporated by reference in its entirety.

TECHNICAL FIELD

The present disclosure relates to the communications field, and in particular, to a method, an apparatus, and a device for determining a modulation and coding order.

BACKGROUND

According to a currently known adaptive modulation and coding (AMC) technology, in a downlink, a terminal device can calculate a channel quality indicator (CQI) value of the current downlink, and can transmit the CQI value to a network device, so that the network device adjusts, according to the CQI value fed back by the terminal device, a downlink Modulation and Coding scheme (MCS) of the user to complete downlink adaptation.

However, with the technical development, for example, in a sparse code multiple access (SCMA) technology or an orthogonal frequency division multiplexing (OFDM) technology, a plurality of terminal devices is already allowed to reuse a same time-frequency resource to perform data transmission.

In this case, the CQI value obtained according to the AMC technology can reflect only general interference on the time-frequency resource reused by the plurality of terminal devices, but cannot reflect specific interference on each terminal device in the plurality of terminal devices reusing the time-frequency resource. Therefore, the AMC technology is no longer applicable to adjustment of a Modulation and Coding scheme for terminal devices that reuse a same time-frequency resource to perform data transmission.

SUMMARY

Embodiments of the present disclosure provide a method, an apparatus, and a device for determining a modulation and coding order, which are applicable to adjustment of a Modulation and Coding scheme for terminal devices that reuse a same time-frequency resource to perform data transmission.

According to a first aspect, a method for determining a Modulation and Coding scheme is provided, where the method is performed by a network device, and the method includes: determining a quantity K of terminal devices that reuse a first time-frequency resource in a first time period to receive downlink data from the network device, where K≥2; obtaining a channel quality indicator CQI, where the CQI is determined according to a signal to interference plus noise ratio SINR of a channel and the quantity K of the terminal devices, where the channel is a channel based on the first time-frequency resource, and the channel is used to transmit downlink data between a first terminal device and the network device in the first time period; and determining a Modulation and Coding scheme MCS of the first terminal device according to the CQI.

With reference to the first aspect, in a first implementation manner of the first aspect, the CQI is determined according to the SINR of the channel, the quantity K of the terminal devices, and a first decoding iteration count, where the first decoding iteration count is a count of decoding iterations performed when the first terminal device performs decoding processing on the downlink data.

With reference to the first aspect and the foregoing implementation manner of the first aspect, in a second implementation manner of the first aspect, the CQI is determined according to the SINR of the channel, the quantity K of the terminal devices, a quantity of first acknowledgement messages, and a quantity of first negative acknowledgement messages, where the first acknowledgement messages are acknowledgement messages sent by the first terminal device to the network device in a hybrid automatic repeat request HARQ process for the downlink data, and the first negative acknowledgement messages are negative acknowledgement messages sent by the first terminal device to the network device in the HARQ process.

With reference to the first aspect and the foregoing implementation manners of the first aspect, in a third implementation manner of the first aspect, the CQI is determined according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the first terminal device performs decoding processing on the downlink data, the first acknowledgement messages are acknowledgement messages sent by the first terminal device to the network device in a hybrid automatic repeat request HARQ process for the downlink data, and the first negative acknowledgement messages are negative acknowledgement messages sent by the first terminal device to the network device in the HARQ process.

With reference to the first aspect and the foregoing implementation manners of the first aspect, in a fourth implementation manner of the first aspect, the obtaining a CQI includes: sending first indicator information to the first terminal device, where the first indicator information is used to indicate the quantity K of the terminal devices; and receiving second indicator information sent by the first terminal device, where the second indicator information is used to indicate the CQI, and the CQI is determined by the first terminal device according to the SINR of the channel and the quantity K of the terminal devices.

With reference to the first aspect and the foregoing implementation manners of the first aspect, in a fifth implementation manner of the first aspect, the obtaining a CQI includes: sending first indicator information to the first terminal device, where the first indicator information is used to indicate the quantity K of the terminal devices; and receiving second indicator information sent by the first terminal device, where the second indicator information is used to indicate the CQI, and the CQI is determined by the first terminal device according to the SINR of the channel, the quantity K of the terminal devices, and a first decoding iteration count, where the first decoding iteration count is a count of decoding iterations performed when the first terminal device performs decoding processing on the downlink data.

With reference to the first aspect and the foregoing implementation manners of the first aspect, in a sixth implementation manner of the first aspect, the obtaining a CQI includes: sending first indicator information to the first terminal device, where the first indicator information is used to indicate the quantity K of the terminal devices; and receiving second indicator information sent by the first terminal device, where the second indicator information is used to indicate the CQI, and the CQI is determined by the first terminal device according to the SINR of the channel, the quantity K of the terminal devices, a quantity of first acknowledgement messages, and a quantity of first negative acknowledgement messages, where the first acknowledgement messages are acknowledgement messages sent by the first terminal device to the network device in a hybrid automatic repeat request HARQ process for the downlink data, and the first negative acknowledgement messages are negative acknowledgement messages sent by the first terminal device to the network device in the HARQ process.

With reference to the first aspect and the foregoing implementation manners of the first aspect, in a seventh implementation manner of the first aspect, the obtaining a CQI includes: sending first indicator information to the first terminal device, where the first indicator information is used to indicate the quantity K of the terminal devices; and receiving second indicator information sent by the first terminal device, where the second indicator information is used to indicate the CQI, and the CQI is determined by the first terminal device according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the first terminal device performs decoding processing on the downlink data, the first acknowledgement messages are acknowledgement messages sent by the first terminal device to the network device in a hybrid automatic repeat request HARQ process for the downlink data, and the first negative acknowledgement messages are negative acknowledgement messages sent by the first terminal device to the network device in the HARQ process.

With reference to the first aspect and the foregoing implementation manners of the first aspect, in an eighth implementation manner of the first aspect, the obtaining a CQI includes: receiving third indicator information sent by the first terminal device, where the third indicator information is used to indicate a CQI fed back by the first terminal device, and the CQI fed back by the first terminal device is determined by the first terminal device according to the SINR of the channel; and processing, according to the quantity K of the terminal devices, the CQI fed back by the first terminal device, so as to determine the CQI.

With reference to the first aspect and the foregoing implementation manners of the first aspect, in a ninth implementation manner of the first aspect, the method further includes: receiving fourth indicator information sent by the first terminal device, where the fourth indicator information is used to indicate a first decoding iteration count, where the first decoding iteration count is a count of decoding iterations performed when the first terminal device performs decoding processing on the downlink data; and the processing, according to the quantity K of the terminal devices, the CQI fed back by the first terminal device includes: processing, according to the quantity K of the terminal devices and the first decoding iteration count, the CQI fed back by the first terminal device.

With reference to the first aspect and the foregoing implementation manners of the first aspect, in a tenth implementation manner of the first aspect, the method further includes: determining a quantity of first acknowledgement messages and a quantity of first negative acknowledgement messages, where the first acknowledgement messages are acknowledgement messages sent by the first terminal device to the network device in an HARQ process for the downlink data, and the first negative acknowledgement messages are negative acknowledgement messages sent by the first terminal device to the network device in the HARQ process; and the processing, according to the quantity K of the terminal devices, the CQI fed back by the first terminal device includes: processing, according to the quantity K of the terminal devices, the quantity of the first acknowledgement messages, and the quantity of the first negative acknowledgement messages, the CQI fed back by the first terminal device.

With reference to the first aspect and the foregoing implementation manners of the first aspect, in an eleventh implementation manner of the first aspect, the method further includes: receiving fourth indicator information sent by the first terminal device, where the fourth indicator information is used to indicate a first decoding iteration count, where the first decoding iteration count is a count of decoding iterations performed when the first terminal device performs decoding processing on the downlink data; and determining a quantity of first acknowledgement messages and a quantity of first negative acknowledgement messages, where the first acknowledgement messages are acknowledgement messages sent by the first terminal device to the network device in an HARQ process for the downlink data, and the first negative acknowledgement messages are negative acknowledgement messages sent by the first terminal device to the network device in the HARQ process; and the processing, according to the quantity K of the terminal devices, the CQI fed back by the first terminal device includes: processing, according to the quantity K of the terminal devices, the first decoding iteration count, the quantity of the first acknowledgement messages, and the quantity of the first negative acknowledgement messages, the CQI fed back by the first terminal device.

With reference to the first aspect and the foregoing implementation manners of the first aspect, in a twelfth implementation manner of the first aspect, the method is applied to a sparse code multiple access communications system, and the first time-frequency resource is a time-frequency resource block including at least two resource elements REs.

According to a second aspect, a method for determining a Modulation and Coding scheme is provided, where the method is performed by a network device, and the method includes: determining a quantity K of terminal devices that reuse a first time-frequency resource in a first time period to receive downlink data from the network device, where K≥2; receiving first indicator information sent by the first terminal device, where the first indicator information is used to indicate a channel quality indicator CQI, the CQI is determined by the first terminal device according to an SINR of a channel, the channel is a channel based on the first time-frequency resource, and the channel is used to transmit downlink data between the first terminal device and the network device in the first time period; and determining, according to preset mapping relationship information, a Modulation and Coding scheme MCS corresponding to a value of the quantity K of the terminal devices and a value of the CQI, and using the MCS as an MCS of the first terminal device, where the mapping relationship information is used to indicate a one-to-one mapping relationship between N parameter sets and N MCSs, each parameter set includes a terminal device quantity value and a CQI value, and N≥2.

With reference to the second aspect, in a first implementation manner of the second aspect, each parameter set further includes a decoding iteration count value; the method further includes: receiving second indicator information sent by the first terminal device, where the second indicator information is used to indicate a first decoding iteration count, where the first decoding iteration count is a count of decoding iterations performed when the first terminal device performs decoding processing on the downlink data; and the determining, according to preset mapping relationship information, an MCS corresponding to a value of the quantity K of the terminal devices and a value of the CQI includes: determining, according to the preset mapping relationship information, an MCS corresponding to the value of the quantity K of the terminal devices, the value of the CQI, and the first decoding iteration count value.

With reference to the second aspect and the foregoing implementation manner of the second aspect, in a second implementation manner of the second aspect, each parameter set further includes a value of a quantity of acknowledgement messages and a value of a quantity of negative acknowledgement messages; the method further includes: determining a quantity of first acknowledgement messages and a quantity of first negative acknowledgement messages, where the first acknowledgement messages are acknowledgement messages sent by the first terminal device to the network device in a hybrid automatic repeat request HARQ process for the downlink data, the first negative acknowledgement messages are negative acknowledgement messages sent by the first terminal device to the network device in the HARQ process, and the adjustment policy information further includes the quantity of the first acknowledgement messages and the quantity of the first negative acknowledgement messages; and the determining, according to preset mapping relationship information, an MCS corresponding to a value of the quantity K of the terminal devices and a value of the CQI includes: determining, according to the preset mapping relationship information, an MCS corresponding to the value of the quantity K of the terminal devices, the value of the CQI, the quantity of the first acknowledgement messages, and the quantity of the first negative acknowledgement messages.

With reference to the second aspect and the foregoing implementation manners of the second aspect, in a third implementation manner of the second aspect, each parameter set further includes a decoding iteration count value, a value of a quantity of acknowledgement messages, and a value of a quantity of negative acknowledgement messages; the method further includes: receiving second indicator information sent by the first terminal device, where the second indicator information is used to indicate a first decoding iteration count, where the first decoding iteration count is a count of decoding iterations performed when the first terminal device performs decoding processing on the downlink data; and determining a quantity of first acknowledgement messages and a quantity of first negative acknowledgement messages, where the first acknowledgement messages are acknowledgement messages sent by the first terminal device to the network device in an HARQ process for the downlink data, the first negative acknowledgement messages are negative acknowledgement messages sent by the first terminal device to the network device in the HARQ process, and the adjustment policy information further includes the quantity of the first acknowledgement messages and the quantity of the first negative acknowledgement messages; and the determining, according to preset mapping relationship information, an MCS corresponding to a value of the quantity K of the terminal devices and a value of the CQI includes: determining, according to the preset mapping relationship information, an MCS corresponding to the value of the quantity K of the terminal devices, the value of the CQI, the first decoding iteration count value, the quantity of the first acknowledgement messages, and the quantity of the first negative acknowledgement messages.

With reference to the second aspect and the foregoing implementation manners of the second aspect, in a fourth implementation manner of the second aspect, the method is applied to a sparse code multiple access communications system, and the first time-frequency resource is a time-frequency resource block including at least two resource elements REs.

According to a third aspect, a method for determining a Modulation and Coding scheme is provided, where the method is performed by a first terminal device in K terminal devices, and the method includes: determining a signal to interference plus noise ratio SINR of a channel, where the channel is a channel based on a first time-frequency resource, the channel is used to transmit downlink data between the first terminal device and a network device in a first time period, the K terminal devices reuse the first time-frequency resource in the first time period to receive downlink data from the network device, and K≥2; receiving first indicator information sent by the network device, where the first indicator information is used to indicate the quantity K of the terminal devices; determining a channel quality indicator CQI according to the signal to interference plus noise ratio SINR of the channel and the quantity K of the terminal devices; and sending second indicator information to the network device, where the second indicator information is used to indicate the CQI, so that the network device determines a Modulation and Coding scheme MCS of the first terminal device according to the CQI.

With reference to the third aspect, in a first implementation manner of the third aspect, the determining a CQI according to the signal to interference plus noise ratio SINR of the channel and the quantity K of the terminal devices includes: determining the CQI according to the SINR of the channel, the quantity K of the terminal devices, and a first decoding iteration count, where the first decoding iteration count is a count of decoding iterations performed when the first terminal device performs decoding processing on the downlink data.

With reference to the third aspect and the foregoing implementation manner of the third aspect, in a second implementation manner of the third aspect, the determining a CQI according to the signal to interference plus noise ratio SINR of the channel and the quantity K of the terminal devices includes: determining the CQI according to the SINR of the channel, the quantity K of the terminal devices, a quantity of first acknowledgement messages, and a quantity of first negative acknowledgement messages, where the first acknowledgement messages are acknowledgement messages sent by the first terminal device to the network device in a hybrid automatic repeat request HARQ process for the downlink data, and the first negative acknowledgement messages are negative acknowledgement messages sent by the first terminal device to the network device in the HARQ process.

With reference to the third aspect and the foregoing implementation manners of the third aspect, in a third implementation manner of the third aspect, the determining a CQI according to the signal to interference plus noise ratio SINR of the channel and the quantity K of the terminal devices includes: determining the CQI according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the first terminal device performs decoding processing on the downlink data, the first acknowledgement messages are acknowledgement messages sent by the first terminal device to the network device in a hybrid automatic repeat request HARQ process for the downlink data, and the first negative acknowledgement messages are negative acknowledgement messages sent by the first terminal device to the network device in the HARQ process.

With reference to the third aspect and the foregoing implementation manners of the third aspect, in a fourth implementation manner of the third aspect, the method is applied to a sparse code multiple access communications system, and the first time-frequency resource is a time-frequency resource block including at least two resource elements REs.

According to a fourth aspect, a method for determining a Modulation and Coding scheme is provided, where the method is performed by a first terminal device in K terminal devices, and the method includes: determining a signal to interference plus noise ratio SINR of a channel, where the channel is a channel based on a first time-frequency resource, the channel is used to transmit downlink data between the first terminal device and a network device in a first time period, the K terminal devices reuse the first time-frequency resource in the first time period to receive downlink data from the network device, and K≥2; determining a channel quality indicator CQI according to the SINR of the channel; and sending first indicator information and second indicator information to the network device, where the first indicator information is used to indicate the CQI, and the second indicator information is used to indicate a first decoding iteration count, where the first decoding iteration count is a count of decoding iterations performed when the first terminal device performs decoding processing on the downlink data, so that the network device determines a Modulation and Coding scheme MCS of the first terminal device according to the quantity K of the terminal devices and the first decoding iteration count.

With reference to the fourth aspect, in a first implementation manner of the fourth aspect, the method is applied to a sparse code multiple access communications system, and the first time-frequency resource is a time-frequency resource block including at least two resource elements REs.

According to a fifth aspect, an apparatus for determining a Modulation and Coding scheme is provided, where the apparatus includes: a quantity determining unit, configured to determine a quantity K of terminal devices that reuse a first time-frequency resource in a first time period to perform downlink data transmission with the apparatus, where K≥2; a CQI determining unit, configured to obtain a channel quality indicator CQI, where the CQI is determined according to a signal to interference plus noise ratio SINR of a channel and the quantity K of the terminal devices, where the channel is a channel based on the first time-frequency resource, and the channel is used to transmit downlink data between a first terminal device and the apparatus in the first time period; and an MCS determining unit, configured to determine a Modulation and Coding scheme MCS of the first terminal device according to the CQI.

With reference to the fifth aspect, in a first implementation manner of the fifth aspect, the CQI is determined according to the SINR of the channel, the quantity K of the terminal devices, and a first decoding iteration count, where the first decoding iteration count is a count of decoding iterations performed when the first terminal device performs decoding processing on the downlink data.

With reference to the fifth aspect and the foregoing implementation manner of the fifth aspect, in a second implementation manner of the fifth aspect, the CQI is determined according to the SINR of the channel, the quantity K of the terminal devices, a quantity of first acknowledgement messages, and a quantity of first negative acknowledgement messages, where the first acknowledgement messages are acknowledgement messages sent by the first terminal device to the apparatus in a hybrid automatic repeat request HARQ process for the downlink data, and the first negative acknowledgement messages are negative acknowledgement messages sent by the first terminal device to the apparatus in the HARQ process.

With reference to the fifth aspect and the foregoing implementation manners of the fifth aspect, in a third implementation manner of the fifth aspect, the CQI is determined according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the first terminal device performs decoding processing on the downlink data, the first acknowledgement messages are acknowledgement messages sent by the first terminal device to the apparatus in a hybrid automatic repeat request HARQ process for the downlink data, and the first negative acknowledgement messages are negative acknowledgement messages sent by the first terminal device to the apparatus in the HARQ process.

With reference to the fifth aspect and the foregoing implementation manners of the fifth aspect, in a fourth implementation manner of the fifth aspect, the apparatus further includes: a sending unit, configured to send first indicator information to the first terminal device, where the first indicator information is used to indicate the quantity K of the terminal devices; and a receiving unit, configured to receive second indicator information sent by the first terminal device, where the second indicator information is used to indicate the CQI, and the CQI is determined by the first terminal device according to the SINR of the channel and the quantity K of the terminal devices; where the CQI determining unit is specifically configured to determine the CQI according to the second indicator information.

With reference to the fifth aspect and the foregoing implementation manners of the fifth aspect, in a fifth implementation manner of the fifth aspect, the apparatus further includes: a sending unit, configured to send first indicator information to the first terminal device, where the first indicator information is used to indicate the quantity K of the terminal devices; and a receiving unit, configured to receive second indicator information sent by the first terminal device, where the second indicator information is used to indicate the CQI, and the CQI is determined by the first terminal device according to the SINR of the channel, the quantity K of the terminal devices, and a first decoding iteration count, where the first decoding iteration count is a count of decoding iterations performed when the first terminal device performs decoding processing on the downlink data; where the CQI determining unit is specifically configured to determine the CQI according to the second indicator information.

With reference to the fifth aspect and the foregoing implementation manners of the fifth aspect, in a sixth implementation manner of the fifth aspect, the apparatus further includes: a sending unit, configured to send first indicator information to the first terminal device, where the first indicator information is used to indicate the quantity K of the terminal devices; and a receiving unit, configured to receive second indicator information sent by the first terminal device, where the second indicator information is used to indicate the CQI, and the CQI is determined by the first terminal device according to the SINR of the channel, the quantity K of the terminal devices, a quantity of first acknowledgement messages, and a quantity of first negative acknowledgement messages, where the first acknowledgement messages are acknowledgement messages sent by the first terminal device to the apparatus in a hybrid automatic repeat request HARQ process for the downlink data, and the first negative acknowledgement messages are negative acknowledgement messages sent by the first terminal device to the apparatus in the HARQ process; where the CQI determining unit is specifically configured to determine the CQI according to the second indicator information.

With reference to the fifth aspect and the foregoing implementation manners of the fifth aspect, in a seventh implementation manner of the fifth aspect, the apparatus further includes: a sending unit, configured to send first indicator information to the first terminal device, where the first indicator information is used to indicate the quantity K of the terminal devices; and a receiving unit, configured to receive second indicator information sent by the first terminal device, where the second indicator information is used to indicate the CQI, and the CQI is determined by the first terminal device according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the first terminal device performs decoding processing on the downlink data, the first acknowledgement messages are acknowledgement messages sent by the first terminal device to the apparatus in a hybrid automatic repeat request HARQ process for the downlink data, and the first negative acknowledgement messages are negative acknowledgement messages sent by the first terminal device to the apparatus in the HARQ process; where the CQI determining unit is specifically configured to determine the CQI according to the second indicator information.

With reference to the fifth aspect and the foregoing implementation manners of the fifth aspect, in an eighth implementation manner of the fifth aspect, the apparatus further includes: a receiving unit, configured to receive third indicator information sent by the first terminal device, where the third indicator information is used to indicate a CQI fed back by the first terminal device, and the CQI fed back by the first terminal device is determined by the first terminal device according to the SINR of the channel; where the CQI determining unit is specifically configured to process, according to the quantity K of the terminal devices, the CQI fed back by the first terminal device, so as to determine the CQI.

With reference to the fifth aspect and the foregoing implementation manners of the fifth aspect, in a ninth implementation manner of the fifth aspect, the receiving unit is further configured to receive fourth indicator information sent by the first terminal device, where the fourth indicator information is used to indicate a first decoding iteration count, where the first decoding iteration count is a count of decoding iterations performed when the first terminal device performs decoding processing on the downlink data; and the CQI determining unit is specifically configured to process, according to the quantity K of the terminal devices and the first decoding iteration count, the CQI fed back by the first terminal device.

With reference to the fifth aspect and the foregoing implementation manners of the fifth aspect, in a tenth implementation manner of the fifth aspect, the CQI determining unit is further configured to determine a quantity of first acknowledgement messages and a quantity of first negative acknowledgement messages, where the first acknowledgement messages are acknowledgement messages sent by the first terminal device to the apparatus in an HARQ process for the downlink data, and the first negative acknowledgement messages are negative acknowledgement messages sent by the first terminal device to the apparatus in the HARQ process; and configured to process, according to the quantity K of the terminal devices, the quantity of the first acknowledgement messages, and the quantity of the first negative acknowledgement messages, the CQI fed back by the first terminal device.

With reference to the fifth aspect and the foregoing implementation manners of the fifth aspect, in an eleventh implementation manner of the fifth aspect, the receiving unit is further configured to receive fourth indicator information sent by the first terminal device, where the fourth indicator information is used to indicate a first decoding iteration count, where the first decoding iteration count is a count of decoding iterations performed when the first terminal device performs decoding processing on the downlink data; and the CQI determining unit is further configured to determine a quantity of first acknowledgement messages and a quantity of first negative acknowledgement messages, where the first acknowledgement messages are acknowledgement messages sent by the first terminal device to the apparatus in an HARQ process for the downlink data, and the first negative acknowledgement messages are negative acknowledgement messages sent by the first terminal device to the apparatus in the HARQ process; and configured to process, according to the quantity K of the terminal devices, the first decoding iteration count, the quantity of the first acknowledgement messages, and the quantity of the first negative acknowledgement messages, the CQI fed back by the first terminal device.

With reference to the fifth aspect and the foregoing implementation manners of the fifth aspect, in a twelfth implementation manner of the fifth aspect, the apparatus is configured in a sparse code multiple access communications system, and the first time-frequency resource is a time-frequency resource block including at least two resource elements REs.

With reference to the fifth aspect and the foregoing implementation manners of the fifth aspect, in a thirteenth implementation manner of the fifth aspect, the apparatus is a network device.

According to a sixth aspect, an apparatus for determining a Modulation and Coding scheme is provided, where the apparatus includes: a quantity determining unit, configured to determine a quantity K of terminal devices that reuse a first time-frequency resource in a first time period to perform downlink data transmission with the apparatus, where K≥2; a receiving unit, configured to receive first indicator information sent by the first terminal device, where the first indicator information is used to indicate a channel quality indicator CQI, the CQI is determined by the first terminal device according to an SINR of a channel, the channel is a channel based on the first time-frequency resource, and the channel is used to transmit downlink data between the first terminal device and the apparatus in the first time period; and an MCS determining unit, configured to determine, according to preset mapping relationship information, a Modulation and Coding scheme MCS corresponding to a value of the quantity K of the terminal devices and a value of the CQI, and use the MCS as an MCS of the first terminal device, where the mapping relationship information is used to indicate a one-to-one mapping relationship between N parameter sets and N MCSs, each parameter set includes a terminal device quantity value and a CQI value, and N≥2.

With reference to the sixth aspect, in a first implementation manner of the sixth aspect, each parameter set further includes a decoding iteration count value; the receiving unit is further configured to receive second indicator information sent by the first terminal device, where the second indicator information is used to indicate a first decoding iteration count, where the first decoding iteration count is a count of decoding iterations performed when the first terminal device performs decoding processing on the downlink data; and the MCS determining unit is specifically configured to determine, according to the preset mapping relationship information, an MCS corresponding to the value of the quantity K of the terminal devices, the value of the CQI, and the first decoding iteration count value.

With reference to the sixth aspect and the foregoing implementation manner of the sixth aspect, in a second implementation manner of the sixth aspect, each parameter set further includes a value of a quantity of acknowledgement messages and a value of a quantity of negative acknowledgement messages; the quantity determining unit is further configured to determine a quantity of first acknowledgement messages and a quantity of first negative acknowledgement messages, where the first acknowledgement messages are acknowledgement messages sent by the first terminal device to the apparatus in a hybrid automatic repeat request HARQ process for the downlink data, the first negative acknowledgement messages are negative acknowledgement messages sent by the first terminal device to the apparatus in the HARQ process, and the adjustment policy information further includes the quantity of the first acknowledgement messages and the quantity of the first negative acknowledgement messages; and the MCS determining unit is specifically configured to determine, according to the preset mapping relationship information, an MCS corresponding to the value of the quantity K of the terminal devices, the value of the CQI, the quantity of the first acknowledgement messages, and the quantity of the first negative acknowledgement messages.

With reference to the sixth aspect and the foregoing implementation manners of the sixth aspect, in a third implementation manner of the sixth aspect, each parameter set further includes a decoding iteration count value, a value of a quantity of acknowledgement messages, and a value of a quantity of negative acknowledgement messages; the receiving unit is further configured to receive second indicator information sent by the first terminal device, where the second indicator information is used to indicate a first decoding iteration count, where the first decoding iteration count is a count of decoding iterations performed when the first terminal device performs decoding processing on the downlink data; the quantity determining unit is further configured to determine a quantity of first acknowledgement messages and a quantity of first negative acknowledgement messages, where the first acknowledgement messages are acknowledgement messages sent by the first terminal device to the apparatus in an HARQ process for the downlink data, the first negative acknowledgement messages are negative acknowledgement messages sent by the first terminal device to the apparatus in the HARQ process, and the adjustment policy information further includes the quantity of the first acknowledgement messages and the quantity of the first negative acknowledgement messages; and the MCS determining unit is specifically configured to determine, according to the preset mapping relationship information, an MCS corresponding to the value of the quantity K of the terminal devices, the value of the CQI, the first decoding iteration count value, the quantity of the first acknowledgement messages, and the quantity of the first negative acknowledgement messages.

With reference to the sixth aspect and the foregoing implementation manners of the sixth aspect, in a fourth implementation manner of the sixth aspect, the apparatus is configured in a sparse code multiple access communications system, and the first time-frequency resource is a time-frequency resource block including at least two resource elements REs.

With reference to the sixth aspect and the foregoing implementation manners of the sixth aspect, in a fifth implementation manner of the sixth aspect, the apparatus is a network device.

According to a seventh aspect, an apparatus for determining a Modulation and Coding scheme is provided, where the apparatus is a first terminal device in K terminal devices, and the apparatus includes: a determining unit, configured to determine a signal to interference plus noise ratio SINR of a channel, where the channel is a channel based on a first time-frequency resource, the channel is used to transmit downlink data between the apparatus and a network device in a first time period, the K terminal devices reuse the first time-frequency resource in the first time period to receive downlink data from the network device, and K≥2; a receiving unit, configured to receive first indicator information sent by the network device, where the first indicator information is used to indicate the quantity K of the terminal devices; where the determining unit is further configured to determine a channel quality indicator CQI according to the signal to interference plus noise ratio SINR of the channel and the quantity K of the terminal devices; and a sending unit, configured to send second indicator information to the network device, where the second indicator information is used to indicate the CQI, so that the network device determines a Modulation and Coding scheme MCS of the apparatus according to the CQI.

With reference to the seventh aspect, in a first implementation manner of the seventh aspect, the determining unit is specifically configured to determine the CQI according to the SINR of the channel, the quantity K of the terminal devices, and a first decoding iteration count, where the first decoding iteration count is a count of decoding iterations performed when the apparatus performs decoding processing on the downlink data.

With reference to the seventh aspect and the foregoing implementation manner of the seventh aspect, in a second implementation manner of the seventh aspect, the determining unit is specifically configured to determine the CQI according to the SINR of the channel, the quantity K of the terminal devices, a quantity of first acknowledgement messages, and a quantity of first negative acknowledgement messages, where the first acknowledgement messages are acknowledgement messages sent by the apparatus to the network device in a hybrid automatic repeat request HARQ process for the downlink data, and the first negative acknowledgement messages are negative acknowledgement messages sent by the apparatus to the network device in the HARQ process.

With reference to the seventh aspect and the foregoing implementation manners of the seventh aspect, in a third implementation manner of the seventh aspect, the determining unit is specifically configured to determine the CQI according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the apparatus performs decoding processing on the downlink data, the first acknowledgement messages are acknowledgement messages sent by the apparatus to the network device in a hybrid automatic repeat request HARQ process for the downlink data, and the first negative acknowledgement messages are negative acknowledgement messages sent by the apparatus to the network device in the HARQ process.

With reference to the seventh aspect and the foregoing implementation manners of the seventh aspect, in a fourth implementation manner of the seventh aspect, the apparatus is configured in a sparse code multiple access communications system, and the first time-frequency resource is a time-frequency resource block including at least two resource elements REs.

According to an eighth aspect, an apparatus for determining a Modulation and Coding scheme is provided, where the apparatus is a first terminal device in K terminal devices, and the apparatus includes: a determining unit, configured to determine a signal to interference plus noise ratio SINR of a channel, where the channel is a channel based on a first time-frequency resource, the channel is used to transmit downlink data between the apparatus and a network device in a first time period, the K terminal devices reuse the first time-frequency resource in the first time period to receive downlink data from the network device, and K≥2; and configured to determine a channel quality indicator CQI according to the SINR of the channel; and a sending unit, configured to send first indicator information and second indicator information to the network device, where the first indicator information is used to indicate the CQI, and the second indicator information is used to indicate a first decoding iteration count, where the first decoding iteration count is a count of decoding iterations performed when the apparatus performs decoding processing on the downlink data, so that the network device determines a Modulation and Coding scheme MCS of the apparatus according to the quantity K of the terminal devices and the first decoding iteration count.

With reference to the eighth aspect, in a first implementation manner of the eighth aspect, the apparatus is configured in a sparse code multiple access communications system, and the first time-frequency resource is a time-frequency resource block including at least two resource elements REs.

According to a ninth aspect, a device for determining a Modulation and Coding scheme is provided, where the device includes: a bus; a processor connected to the bus; a memory connected to the bus; and a transceiver connected to the bus; where the processor invokes, by using the bus, a program stored in the memory, so that the processor is configured to determine a quantity K of terminal devices that reuse a first time-frequency resource in a first time period to perform downlink data transmission with the device, where K≥2; configured to obtain a channel quality indicator CQI, where the CQI is determined according to a signal to interference plus noise ratio SINR of a channel and the quantity K of the terminal devices, where the channel is a channel based on the first time-frequency resource, and the channel is used to transmit downlink data between a first terminal device and the device in the first time period; and configured to determine a Modulation and Coding scheme MCS of the first terminal device according to the CQI.

With reference to the ninth aspect, in a first implementation manner of the ninth aspect, the CQI is determined according to the SINR of the channel, the quantity K of the terminal devices, and a first decoding iteration count, where the first decoding iteration count is a count of decoding iterations performed when the first terminal device performs decoding processing on the downlink data.

With reference to the ninth aspect and the foregoing implementation manner of the ninth aspect, in a second implementation manner of the ninth aspect, the CQI is determined according to the SINR of the channel, the quantity K of the terminal devices, a quantity of first acknowledgement messages, and a quantity of first negative acknowledgement messages, where the first acknowledgement messages are acknowledgement messages sent by the first terminal device to the device in a hybrid automatic repeat request HARQ process for the downlink data, and the first negative acknowledgement messages are negative acknowledgement messages sent by the first terminal device to the device in the HARQ process.

With reference to the ninth aspect and the foregoing implementation manners of the ninth aspect, in a third implementation manner of the ninth aspect, the CQI is determined according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the first terminal device performs decoding processing on the downlink data, the first acknowledgement messages are acknowledgement messages sent by the first terminal device to the device in a hybrid automatic repeat request HARQ process for the downlink data, and the first negative acknowledgement messages are negative acknowledgement messages sent by the first terminal device to the device in the HARQ process.

With reference to the ninth aspect and the foregoing implementation manners of the ninth aspect, in a fourth implementation manner of the ninth aspect, the processor is specifically configured to control the transceiver to send first indicator information to the first terminal device, where the first indicator information is used to indicate the quantity K of the terminal devices; and control the transceiver to receive second indicator information sent by the first terminal device, where the second indicator information is used to indicate the CQI, and the CQI is determined by the first terminal device according to the SINR of the channel and the quantity K of the terminal devices.

With reference to the ninth aspect and the foregoing implementation manners of the ninth aspect, in a fifth implementation manner of the ninth aspect, the processor is specifically configured to control the transceiver to send first indicator information to the first terminal device, where the first indicator information is used to indicate the quantity K of the terminal devices; and configured to control the transceiver to receive second indicator information sent by the first terminal device, where the second indicator information is used to indicate the CQI, and the CQI is determined by the first terminal device according to the SINR of the channel, the quantity K of the terminal devices, and a first decoding iteration count, where the first decoding iteration count is a count of decoding iterations performed when the first terminal device performs decoding processing on the downlink data.

With reference to the ninth aspect and the foregoing implementation manners of the ninth aspect, in a sixth implementation manner of the ninth aspect, the processor is specifically configured to control the transceiver to send first indicator information to the first terminal device, where the first indicator information is used to indicate the quantity K of the terminal devices; and control the transceiver to receive second indicator information sent by the first terminal device, where the second indicator information is used to indicate the CQI, and the CQI is determined by the first terminal device according to the SINR of the channel, the quantity K of the terminal devices, a quantity of first acknowledgement messages, and a quantity of first negative acknowledgement messages, where the first acknowledgement messages are acknowledgement messages sent by the first terminal device to the device in a hybrid automatic repeat request HARQ process for the downlink data, and the first negative acknowledgement messages are negative acknowledgement messages sent by the first terminal device to the device in the HARQ process.

With reference to the ninth aspect and the foregoing implementation manners of the ninth aspect, in a seventh implementation manner of the ninth aspect, the processor is specifically configured to control the transceiver to send first indicator information to the first terminal device, where the first indicator information is used to indicate the quantity K of the terminal devices; and control the transceiver to receive second indicator information sent by the first terminal device, where the second indicator information is used to indicate the CQI, and the CQI is determined by the first terminal device according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the first terminal device performs decoding processing on the downlink data, the first acknowledgement messages are acknowledgement messages sent by the first terminal device to the device in a hybrid automatic repeat request HARQ process for the downlink data, and the first negative acknowledgement messages are negative acknowledgement messages sent by the first terminal device to the device in the HARQ process.

With reference to the ninth aspect and the foregoing implementation manners of the ninth aspect, in an eighth implementation manner of the ninth aspect, the processor is specifically configured to control the transceiver to receive third indicator information sent by the first terminal device, where the third indicator information is used to indicate a CQI fed back by the first terminal device, and the CQI fed back by the first terminal device is determined by the first terminal device according to the SINR of the channel; and configured to process, according to the quantity K of the terminal devices, the CQI fed back by the first terminal device, so as to determine the CQI.

With reference to the ninth aspect and the foregoing implementation manners of the ninth aspect, in a ninth implementation manner of the ninth aspect, the processor is specifically configured to control the transceiver to receive fourth indicator information sent by the first terminal device, where the fourth indicator information is used to indicate a first decoding iteration count, where the first decoding iteration count is a count of decoding iterations performed when the first terminal device performs decoding processing on the downlink data; and configured to process, according to the quantity K of the terminal devices and the first decoding iteration count, the CQI fed back by the first terminal device.

With reference to the ninth aspect and the foregoing implementation manners of the ninth aspect, in a tenth implementation manner of the ninth aspect, the processor is specifically configured to determine a quantity of first acknowledgement messages and a quantity of first negative acknowledgement messages, where the first acknowledgement messages are acknowledgement messages sent by the first terminal device to the device in an HARQ process for the downlink data, and the first negative acknowledgement messages are negative acknowledgement messages sent by the first terminal device to the device in the HARQ process; and configured to process, according to the quantity K of the terminal devices, the quantity of the first acknowledgement messages, and the quantity of the first negative acknowledgement messages, the CQI fed back by the first terminal device.

With reference to the ninth aspect and the foregoing implementation manners of the ninth aspect, in an eleventh implementation manner of the ninth aspect, the processor is specifically configured to control the transceiver to receive fourth indicator information sent by the first terminal device, where the fourth indicator information is used to indicate a first decoding iteration count, where the first decoding iteration count is a count of decoding iterations performed when the first terminal device performs decoding processing on the downlink data; configured to determine a quantity of first acknowledgement messages and a quantity of first negative acknowledgement messages, where the first acknowledgement messages are acknowledgement messages sent by the first terminal device to the device in an HARQ process for the downlink data, and the first negative acknowledgement messages are negative acknowledgement messages sent by the first terminal device to the device in the HARQ process; and configured to process, according to the quantity K of the terminal devices, the first decoding iteration count, the quantity of the first acknowledgement messages, and the quantity of the first negative acknowledgement messages, the CQI fed back by the first terminal device.

With reference to the ninth aspect and the foregoing implementation manners of the ninth aspect, in a twelfth implementation manner of the ninth aspect, the device is configured in a sparse code multiple access communications system, and the first time-frequency resource is a time-frequency resource block including at least two resource elements REs.

With reference to the ninth aspect and the foregoing implementation manners of the ninth aspect, in a thirteenth implementation manner of the ninth aspect, the device is a network device.

According to a tenth aspect, a device for determining a Modulation and Coding scheme is provided, where the device includes: a bus; a processor connected to the bus; a memory connected to the bus; and a transceiver connected to the bus; where the processor invokes, by using the bus, a program stored in the memory, so that the processor is configured to determine a quantity K of terminal devices that reuse a first time-frequency resource in a first time period to perform downlink data transmission with the device, where K≥2; configured to control the transceiver to receive first indicator information sent by the first terminal device, where the first indicator information is used to indicate a channel quality indicator CQI, the CQI is determined by the first terminal device according to an SINR of a channel, the channel is a channel based on the first time-frequency resource, and the channel is used to transmit downlink data between the first terminal device and the device in the first time period; and configured to determine, according to preset mapping relationship information, a Modulation and Coding scheme MCS corresponding to a value of the quantity K of the terminal devices and a value of the CQI, and use the MCS as an MCS of the first terminal device, where the mapping relationship information is used to indicate a one-to-one mapping relationship between N parameter sets and N MCSs, each parameter set includes a terminal device quantity value and a CQI value, and N≥2.

With reference to the tenth aspect, in a first implementation manner of the tenth aspect, each parameter set further includes a decoding iteration count value; and the processor is further configured to control the transceiver to receive second indicator information sent by the first terminal device, where the second indicator information is used to indicate a first decoding iteration count, where the first decoding iteration count is a count of decoding iterations performed when the first terminal device performs decoding processing on the downlink data; and configured to determine, according to the preset mapping relationship information, an MCS corresponding to the value of the quantity K of the terminal devices, the value of the CQI, and the first decoding iteration count value.

With reference to the tenth aspect and the foregoing implementation manner of the tenth aspect, in a second implementation manner of the tenth aspect, each parameter set further includes a value of a quantity of acknowledgement messages and a value of a quantity of negative acknowledgement messages; and the processor is further configured to determine a quantity of first acknowledgement messages and a quantity of first negative acknowledgement messages, where the first acknowledgement messages are acknowledgement messages sent by the first terminal device to the device in a hybrid automatic repeat request HARQ process for the downlink data, the first negative acknowledgement messages are negative acknowledgement messages sent by the first terminal device to the device in the HARQ process, and the adjustment policy information further includes the quantity of the first acknowledgement messages and the quantity of the first negative acknowledgement messages; and configured to determine, according to the preset mapping relationship information, an MCS corresponding to the value of the quantity K of the terminal devices, the value of the CQI, the quantity of the first acknowledgement messages, and the quantity of the first negative acknowledgement messages.

With reference to the tenth aspect and the foregoing implementation manners of the tenth aspect, in a third implementation manner of the tenth aspect, each parameter set further includes a decoding iteration count value, a value of a quantity of acknowledgement messages, and a value of a quantity of negative acknowledgement messages; and the processor is further configured to control the transceiver to receive second indicator information sent by the first terminal device, where the second indicator information is used to indicate a first decoding iteration count, where the first decoding iteration count is a count of decoding iterations performed when the first terminal device performs decoding processing on the downlink data; configured to determine a quantity of first acknowledgement messages and a quantity of first negative acknowledgement messages, where the first acknowledgement messages are acknowledgement messages sent by the first terminal device to the device in an HARQ process for the downlink data, the first negative acknowledgement messages are negative acknowledgement messages sent by the first terminal device to the device in the HARQ process, and the adjustment policy information further includes the quantity of the first acknowledgement messages and the quantity of the first negative acknowledgement messages; and configured to determine, according to the preset mapping relationship information, an MCS corresponding to the value of the quantity K of the terminal devices, the value of the CQI, the first decoding iteration count value, the quantity of the first acknowledgement messages, and the quantity of the first negative acknowledgement messages.

With reference to the tenth aspect and the foregoing implementation manners of the tenth aspect, in a fourth implementation manner of the tenth aspect, the device is configured in a sparse code multiple access communications system, and the first time-frequency resource is a time-frequency resource block including at least two resource elements REs.

With reference to the tenth aspect and the foregoing implementation manners of the tenth aspect, in a fifth implementation manner of the tenth aspect, the device is a network device.

According to an eleventh aspect, a device for determining a Modulation and Coding scheme is provided, where the device is a first terminal device in K terminal devices, and the device includes: a bus; a processor connected to the bus; a memory connected to the bus; and a transceiver connected to the bus; where the processor invokes, by using the bus, a program stored in the memory, so that the processor is configured to determine a signal to interference plus noise ratio SINR of a channel, where the channel is a channel based on a first time-frequency resource, the channel is used to transmit downlink data between the device and a network device in a first time period, the K terminal devices reuse the first time-frequency resource in the first time period to receive downlink data from the network device, and K≥2; configured to control the transceiver to receive first indicator information sent by the network device, where the first indicator information is used to indicate the quantity K of the terminal devices; configured to determine a channel quality indicator CQI according to the signal to interference plus noise ratio SINR of the channel and the quantity K of the terminal devices; and configured to control the transceiver to send second indicator information to the network device, where the second indicator information is used to indicate the CQI, so that the network device determines a Modulation and Coding scheme MCS of the device according to the CQI.

With reference to the eleventh aspect, in a first implementation manner of the eleventh aspect, the processor is specifically configured to determine the CQI according to the SINR of the channel, the quantity K of the terminal devices, and a first decoding iteration count, where the first decoding iteration count is a count of decoding iterations performed when the device performs decoding processing on the downlink data.

With reference to the eleventh aspect and the foregoing implementation manner of the eleventh aspect, in a second implementation manner of the eleventh aspect, the processor is specifically configured to determine the CQI according to the SINR of the channel, the quantity K of the terminal devices, a quantity of first acknowledgement messages, and a quantity of first negative acknowledgement messages, where the first acknowledgement messages are acknowledgement messages sent by the device to the network device in a hybrid automatic repeat request HARQ process for the downlink data, and the first negative acknowledgement messages are negative acknowledgement messages sent by the device to the network device in the HARQ process.

With reference to the eleventh aspect and the foregoing implementation manners of the eleventh aspect, in a third implementation manner of the eleventh aspect, the processor is specifically configured to determine the CQI according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the device performs decoding processing on the downlink data, the first acknowledgement messages are acknowledgement messages sent by the device to the network device in a hybrid automatic repeat request HARQ process for the downlink data, and the first negative acknowledgement messages are negative acknowledgement messages sent by the device to the network device in the HARQ process.

With reference to the eleventh aspect and the foregoing implementation manners of the eleventh aspect, in a fourth implementation manner of the eleventh aspect, the device belongs to a sparse code multiple access communications system, and the first time-frequency resource is a time-frequency resource block including at least two resource elements REs.

According to a twelfth aspect, a device for determining a Modulation and Coding scheme is provided, where the device is executed in K terminal devices, and the device includes: a bus; a processor connected to the bus; a memory connected to the bus; and a transceiver connected to the bus; where the processor invokes, by using the bus, a program stored in the memory, so that the processor is configured to determine a signal to interference plus noise ratio SINR of a channel, where the channel is a channel based on a first time-frequency resource, the channel is used to transmit downlink data between the device and a network device in a first time period, the K terminal devices reuse the first time-frequency resource in the first time period to receive downlink data from the network device, and K≥2; configured to determine a channel quality indicator CQI according to the SINR of the channel; and configured to control the transceiver to send first indicator information and second indicator information to the network device, where the first indicator information is used to indicate the CQI, and the second indicator information is used to indicate a first decoding iteration count, where the first decoding iteration count is a count of decoding iterations performed when the device performs decoding processing on the downlink data, so that the network device determines a Modulation and Coding scheme MCS of the device according to the quantity K of the terminal devices and the first decoding iteration count.

With reference to the twelfth aspect, in a first implementation manner of the twelfth aspect, the device belongs to a sparse code multiple access communications system, and the first time-frequency resource is a time-frequency resource block including at least two resource elements REs.

According to the method, apparatus, and device for determining a Modulation and Coding scheme in the embodiments of the present disclosure, K terminal devices reuse a same time-frequency resource in a same time period to perform data transmission with a network device; data is transmitted between a first terminal device and the network device through a channel based on the time-frequency resource, and a CQI determined based on a signal to interference plus noise ratio of the channel is processed according to the quantity K of the terminal devices, so that a processed CQI can reflect interference noise in the data transmission process of the first terminal device; and a Modulation and Coding scheme of the first terminal device is adjusted according to the processed CQI, so that an adjusted Modulation and Coding scheme can adapt to the interference noise of the first terminal device. Therefore, the method, apparatus, and device are applicable to adjustment of a Modulation and Coding scheme for terminal devices that reuse a same time-frequency resource to perform data transmission.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 4 is a schematic interaction diagram of a method for determining a Modulation and Coding scheme according to another embodiment of the present disclosure;

FIG. 5 is a schematic flowchart of a method for determining a Modulation and Coding scheme according to another embodiment of the present disclosure;

FIG. 6 is a schematic interaction diagram of a method for determining a Modulation and Coding scheme according to still another embodiment of the present disclosure;

FIG. 7 is a schematic flowchart of a method for determining a Modulation and Coding scheme according to still another embodiment of the present disclosure;

FIG. 8 is a schematic flowchart of a method for determining a Modulation and Coding scheme according to still another embodiment of the present disclosure;

DESCRIPTION OF EMBODIMENTS

Figure 1:
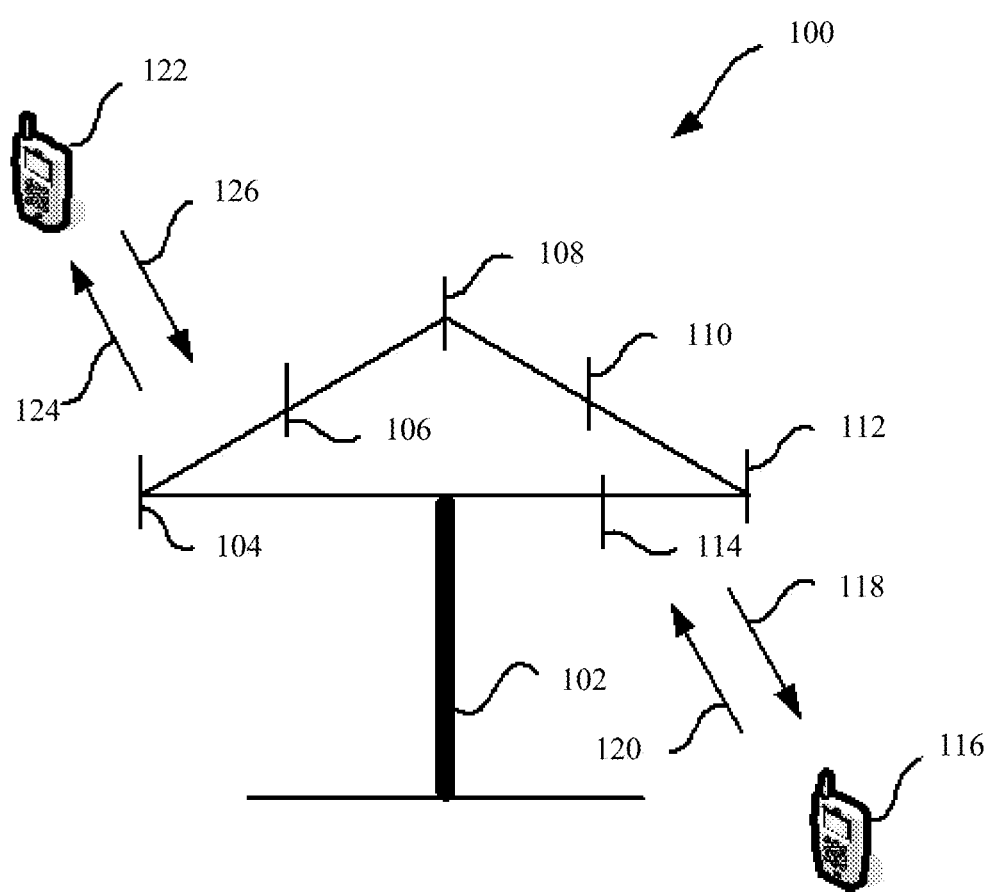
FIG. 1 is a schematic diagram of a communications system using a method for determining a Modulation and Coding scheme according to the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one components interacting with another component in a local system, a distributed system, and/or across a network such as the Internet interacting with other systems by using the signal).

Each embodiment of the present disclosure is described with reference to a terminal device. The terminal device may also be referred to as an access terminal, a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a SIP (Session Initiation Protocol) phone, a WLL (wireless local loop) station, a PDA (personal digital assistant), a handheld device having a wireless communication function, a computing device, another processing device connected to a wireless modem, an in-vehicle device, a wearable device, or a terminal device in a future 5G network.

In addition, each embodiment of the present disclosure is described with reference to a network device. The network device can be used to communicate with a mobile device; and the network device may be a BTS (base transceiver station) in GSM (Global System for Mobile communication) or CDMA (Code Division Multiple Access); or may be an NB (NodeB) in WCDMA (Wideband Code Division Multiple Access); or may further be an eNB or eNodeB (evolved NodeB) in LTE (Long Term Evolution), a relay station or an access point, an in-vehicle device, a wearable device, or a network device in a future 5G network, or the like.

In addition, aspects or features of the present disclosure may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a CD (compact disk), a DVD (digital versatile disk), a smart card and a flash memory component (for example, EPROM (erasable programmable read-only memory), a card, a stick, or a key drive). In addition, various storage media described in this specification may indicate one or more devices and/or other machine-readable media that is used to store information. The term "machine readable media" may include but is not limited to a radio channel, and various other media that can store, contain and/or carry an instruction and/or data.

FIG. 1 is a schematic diagram of a communications system using a method for determining a Modulation and Coding scheme according to the present disclosure. As shown in FIG. 1, the communications system 100 includes a network device 102, where the network device 102 may include a plurality of antenna groups. Each antenna group may include one or more antennas. For example, an antenna group may include antennas 104 and 106, another antenna group may include antennas 108 and 110, and an additional group may include antennas 112 and 114. FIG. 1 shows two antennas for each antenna group, but more or fewer antennas may be used for each group. The network device 102 may additionally include a transmitter chain and a receiver chain. A person of ordinary skill in the art may understand that both the transmitter chain and the receiver chain may include a plurality of components related to signal transmission and reception (for example, processors, modulators, multiplexers, demodulators, demultiplexers, or antennas).

The network device 102 may communicate with a plurality of terminal devices (for example, a terminal device 116 and a terminal device 122). However, it may be understood that, the network device 102 can communicate with any quantity of terminal devices similar to the terminal device 116 or 122. The terminal devices 116 and 122 may be, for example, cellular phones, smartphones, portable computers, handheld communications devices, handheld computing devices, satellite radio apparatuses, global positioning systems, PDAs, and/or any other appropriate devices used for communication in the wireless communications system 100.

As shown in FIG. 1, the terminal device 116 communicates with the antennas 112 and 114, where the antennas 112 and 114 transmit information to the terminal device 116 through a forward link 118, and receive information from the terminal device 116 through a reverse link 120. In addition, the terminal device 122 communicates with the antennas 104 and 106, where the antennas 104 and 106 transmit information to the terminal device 122 through a forward link 124, and receive information from the terminal device 122 through a reverse link 126.

For example, in a frequency division duplex (FDD) system, for example, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna group and/or area designed for communication is referred to as a sector of the network device 102. For example, the antenna group may be designed to communicate with a terminal device in a sector of a coverage area of the network device 102. In a process in which the network device 102 communicates with the terminal devices 116 and 122 through the forward links 118 and 124 respectively, transmit antennas of the network device 102 may use beamforming to improve signal to interference plus noise ratio s of the forward links 118 and 124. In addition, in contrast to a manner in which a network device uses a single antenna to transmit signals to all terminal devices served by the network device, when the network device 102 uses beamforming to transmit signals to the terminal devices 116 and 122 that are distributed randomly in a related coverage area, mobile devices in a neighboring cell may receive less interference.

At a given time, the network device 102, the terminal device 116, or the terminal device 122 may be a wireless communications transmitting apparatus and/or a wireless communications receiving apparatus. During data transmission, a wireless communications transmitting apparatus may encode data for transmission. Specifically, the wireless communications transmitting apparatus may obtain (for example, generate, receive from another communications apparatus, or store in a memory) a certain quantity of data bits that need to be transmitted to a wireless communications receiving apparatus through a channel. Such data bits may be included in a transport block (or a plurality of transport blocks) of data, where the transport block may be segmented to generate a plurality of code blocks.

It should be noted that, in the communications system 100 using a method and an apparatus for determining a Modulation and Coding scheme according to an embodiment of the present disclosure, a plurality of terminal devices reuses a same time-frequency resource in a same time period to perform data transmission with the network device. In addition, for example, in a manner of time-frequency resource division in units of resource elements (REs), the same time-frequency resource may be a time-frequency resource block (which may also be referred to as a time-frequency resource group) including a plurality of REs, and the plurality of REs may be in a same position in a time domain (that is, corresponding to a same symbol) and in different positions in a frequency domain (that is, corresponding to different subcarriers), or the plurality of REs may be in different positions in a time domain (that is, corresponding to different symbols) and in a same position in a frequency domain (that is, corresponding to a same subcarrier). This is not particularly limited in the present disclosure.

Optionally, the communications system is a sparse code multiple access communications system, and the time-frequency resource is a time-frequency resource block including at least two resource elements REs.

Specifically, sparse code multiple access (SCMA) is a new multiple access mode. In this access mode, a plurality of users reuses a same time-frequency resource block to perform data transmission. Each resource block includes several resource REs. An RE herein may be a subcarrier-symbol unit in an OFDM technology, or may be a resource element in a time domain or frequency domain in another air interface technology. For example, in an SCMA system including K terminal devices, an available resource is divided into several orthogonal time-frequency resource blocks, and each resource block includes L REs, where the L REs may be in a same position in the time domain. When a terminal device #k transmits data, first, the data to be transmitted is divided into data blocks with a size of S bits. A codebook (determined by the network device and delivered to the terminal device) of the terminal device #k is queried, and each data block is mapped to a group of modulation symbols $X\#k=\{X\#k_1, X\#k_2, \ldots, X\#k_L\}$, where each modulation symbol corresponds to one RE in a resource block. Then, a signal waveform is generated according to the modulation symbols. For the data blocks with the size of S bits, each codebook includes 2S different modulation symbol groups corresponding to 2S possible data blocks.

The foregoing codebook is a code word set, and a code word is a mapping relationship from an information bit to a transmission symbol. That is, the codebook is a set of such mapping relationships.

In addition, in SCMA, in the group of modulation symbols $X\#k=\{X\#k_1, X\#k_2, \ldots, X\#k_L\}$ corresponding to each terminal device, at least one symbol is a zero symbol, and at least one symbol is a non-zero symbol. That is, for data of a terminal device, only some REs (at least one RE) of L REs carry data of the terminal device.

It should be understood that, the SCMA system illustrated above is only an example of a communications system using a method and an apparatus for determining a Modulation and Coding scheme according to the present disclosure. However, the present disclosure is not limited thereto. All other communications systems that enable terminal devices to reuse a same time-frequency resource in a same time period to perform data transmission shall fall within the protection scope of the present disclosure.

For ease of understanding and description, in the following embodiments, unless otherwise specified, a method for determining a Modulation and Coding scheme according to an embodiment of the present disclosure is described by using an application in the SCMA system as an example.

In addition, in an embodiment of the present disclosure, because a plurality of terminal devices reuses a same time-frequency resource to perform transmission with a network device, the network device may perform data transmission with a plurality of terminal devices at a same time. Because data transmission processes between the network device and the terminal devices are similar, for ease of understanding and description, the following uses a data transmission process between the network device and a terminal device #1 (namely, an example of a first terminal device) in a plurality of terminal devices as an example for description.

Figure 2:
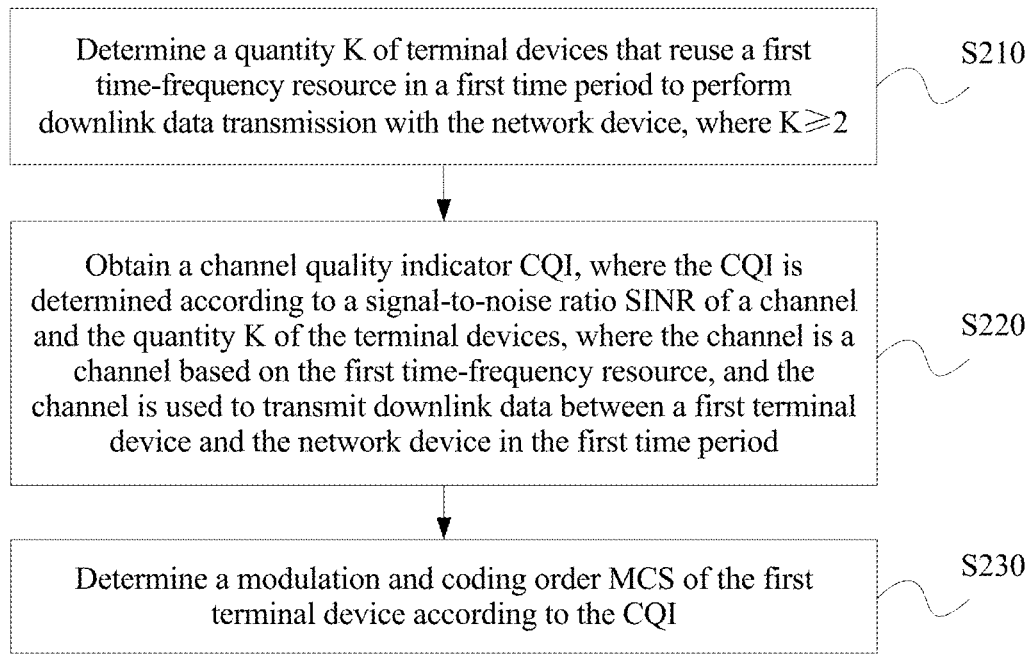
FIG. 2 is a schematic flowchart of a method for determining a Modulation and Coding scheme according to an embodiment of the present disclosure.

FIG. 2 shows a schematic flowchart of a method 200 for determining a Modulation and Coding scheme according to an embodiment of the present disclosure, where the method is described from a perspective of a network device. The method 200 is performed by a network device. As shown in FIG. 2, the method 200 includes:

S210. Determine a quantity K of terminal devices that reuse a first time-frequency resource in a first time period to receive downlink data from the network device, where K≥2.

S220. Obtain a channel quality indicator CQI, where the CQI is determined according to a signal to interference plus noise ratio SINR of a channel and the quantity K of the terminal devices, where the channel is a channel based on the first time-frequency resource, and the channel is used to transmit downlink data between a first terminal device and the network device in the first time period.

S230. Determine a Modulation and Coding scheme MCS of the first terminal device according to the CQI.

The method 200 may be applied to downlink transmission. As described above, the network device may determine to use, in a same time period (including the first time period, hereinafter denoted as a time period #A for ease of understanding and distinguishing), a same time-frequency resource (for example, in SCMA mode) to perform data transmission with K terminal devices including a terminal device #1.

The network device may determine downlink transmission information for the terminal device #1, where the downlink transmission information includes the following information:

a codebook used by the terminal device #1 in the time period #A (namely, an example of the first time period) to perform downlink transmission;

a time-frequency resource block #A used by the terminal device #1 in the time period #A to perform downlink transmission, where the time-frequency resource block #A includes a plurality of REs (for example, corresponding to a same symbol and corresponding to different subcarriers), where a plurality of terminal devices including the terminal device #1 reuses the time-frequency resource block #A to perform downlink transmission; and an initial MCS used by the terminal device #1 in the time period #A to perform downlink transmission.

In addition, the network device may transmit the downlink transmission information to the terminal device #1, for example, through a control channel or a broadcast channel.

It should be understood that, the downlink transmission information illustrated above is merely an example. The present disclosure is not limited thereto. In conventional SCMA, all other information used for downlink transmission and delivered to the terminal device by the network device before downlink transmission is performed shall fall within the protection scope of the present disclosure. Hereinafter for avoiding repetition, detailed descriptions about similar cases are omitted.

Therefore, the terminal device #1 can determine, according to the downlink transmission information, a position (including a time-domain position and a frequency-domain position) of the time-frequency resource block #A carrying downlink data, and the initial MCS used when decoding processing is performed on the downlink transmission data.

Afterward, the network device may perform, according to the determined initial MCS, coding processing on data that needs to be transmitted to the terminal device #1 (for example, an original bit sequence), to generate downlink data (namely, an example of data), and transmit the downlink data to the terminal device #1 through a channel #A based on the time-frequency resource block #A (namely, an example of a channel) in the time period #A.

The terminal device #1 can receive the downlink data through the channel #A in the time period #A, and perform decoding processing on the downlink data by using the initial MCS, to restore the downlink data to the data existing before the network device performs coding processing (for example, the original bit sequence).

It should be noted that, in this embodiment of the present disclosure, the coding processing by the network device, the decoding processing by the terminal device #1, and the transmission process of the downlink data may be similar to those in the prior art. Herein for avoiding repetition, detailed descriptions thereof are omitted.

Afterward, the network device may determine a CQI of the channel #A, where the CQI is determined according to the quantity K of the terminal devices and an SINR of a channel between the network device and the terminal device #1.

Optionally, the CQI is determined according to the SINR of the channel, the quantity K of the terminal devices, and a first decoding iteration count, where the first decoding iteration count is a count of decoding iterations performed when the first terminal device performs decoding processing on the downlink data.

Optionally, the CQI is determined according to the SINR of the channel, the quantity K of the terminal devices, a quantity of first acknowledgement messages, and a quantity of first negative acknowledgement messages, where the first acknowledgement messages are acknowledgement messages sent by the first terminal device to the network device in a hybrid automatic repeat request HARQ process for the downlink data, and the first negative acknowledgement messages are negative acknowledgement messages sent by the first terminal device to the network device in the HARQ process.

Optionally, the CQI is determined according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the first terminal device performs decoding processing on the downlink data, the first acknowledgement messages are acknowledgement messages sent by the first terminal device to the network device in a hybrid automatic repeat request HARQ process for the downlink data, and the first negative acknowledgement messages are negative acknowledgement messages sent by the first terminal device to the network device in the HARQ process.

Specifically, in this embodiment of the present disclosure, in addition to the quantity K of the terminal devices and the SINR of the channel between the network device and the terminal device #1, use of a decoding iteration count, a quantity of acknowledgement messages, and a quantity of negative acknowledgement messages may be further considered. Detailed descriptions are provided later with reference to actions of the network device and the terminal device #1.

In this embodiment of the present disclosure, the CQI may be determined by the network device according to a preset rule (namely, a manner 1), or may be determined by the terminal device #1 according to the preset rule and reported to the network device (namely, a manner 2). The following describes the two manners respectively in detail.

Manner 1

According to different preset rules used (or parameters used) by the network device for processing the CQI, the manner 1 may be classified into a manner 1a, a manner 1b, a manner 1c, and a manner 1d.

Manner 1a

An example of the preset rule may be processing, based on only the quantity K of the terminal devices, a CQI fed back by the terminal device #1.

Optionally, the method further includes: receiving third indicator information sent by the first terminal device, where the third indicator information is used to indicate a CQI fed back by the first terminal device, and the CQI fed back by the first terminal device is determined by the first terminal device according to the SINR of the channel; and processing, according to the quantity K of the terminal devices, the CQI fed back by the first terminal device, so as to determine the CQI.

Specifically, the terminal device #1 may perform channel estimation on the channel #A according to pilot information carried in the downlink data, for example, a cell-specific reference signal (CRS), and further calculate an SINR of the channel #A, so as to send, to the network device by using the third indicator information, a CQI value corresponding to the SINR of the channel #A (denoted as a CQI#1 for ease of understanding and distinguishing hereinafter).

It should be understood that, the method and process illustrated above for determining the SINR of the channel #A by the terminal device #1 are merely examples, and are not particularly limited in the present disclosure, and may also be similar to those in another prior art used by the terminal device to determine the SINR of the channel. Herein for avoiding repetition, detailed descriptions thereof are omitted. In addition, descriptions about similar cases are omitted hereinafter.

Therefore, the network device may process the CQI#1 according to the quantity K of the terminal devices.

For example, the network device may process the CQI#1 based on the following formula 1.

$$MCQI = SINR \times ue\_factor \qquad \text{formula 1}$$

$$ue\_factor = \begin{cases} a & ue\_num \leq w \\ b & w < ue\_num \leq x \\ c & x < ue\_num \leq y \\ d & y < ue\_num \leq z \end{cases}$$

In the formula, MCQI indicates a processed CQI (denoted as a CQI#2 for ease of understanding), SINR indicates that the SINR of the channel #A corresponds to the CQI#1, ue_num indicates the quantity K of the terminal devices, a, b, c, and d are preset constants, value ranges of a, b, c, and d may be (0, 1], a relationship between a, b, c, and d may be a>b>c>d, and w, x, y, and z may be preset positive integers. In addition, the method for determining the SINR based on the CQI may be similar to that in the prior art. Herein for avoiding repetition, a detailed description thereof is omitted. In addition, descriptions about similar cases are omitted hereinafter.

Manner 1b

Another example of the preset rule may be processing, according to the quantity K of the terminal devices and quantities of acknowledgement messages and negative acknowledgement messages that are sent by the first terminal device to the network device in a hybrid automatic repeat request (HARQ) process for the downlink data, the CQI fed back by the terminal device #1.

Optionally, the method further includes:

determining a quantity of first acknowledgement messages and a quantity of first negative acknowledgement messages, where the first acknowledgement messages are acknowledgement messages sent by the first terminal device to the network device in an HARQ process for the downlink data, and the first negative acknowledgement messages are negative acknowledgement messages sent by the first terminal device to the network device in the HARQ process; and the processing, according to the quantity K of the terminal devices, the CQI fed back by the first terminal device includes:

processing, according to the quantity K of the terminal devices, the quantity of the first acknowledgement messages, and the quantity of the first negative acknowledgement messages, the CQI fed back by the first terminal device.

Specifically, the terminal device #1 and the network device may transmit CQI#1 information in a manner similar to the manner 1a.

In addition, in the process of transmitting the downlink data with the network device, the network device may record a quantity of acknowledgement (ACK) messages sent by the terminal device #1 to the network device and a quantity of negative acknowledgement (NACK) messages sent by the terminal device #1 to the network device in the HARQ process. In addition, in this embodiment of the present disclosure, the HARQ process performed between the terminal device #1 and the network device may be similar to that in the prior art. Herein for avoiding repetition, a detailed description thereof is omitted. In addition, descriptions about similar cases are omitted hereinafter.

Therefore, the network device may process the CQI#1 according to the quantity K of the terminal devices, the quantity of the ACK messages, and the quantity of the NACK messages.

For example, the network device may process the CQI#1 based on the following formula 2.

$$MCQI = SINR \times ue\_factor + \frac{0.1 - NACK\_rate}{1 - 0.1} \times 0.1 \qquad \text{formula 2}$$

$$ue\_factor = \begin{cases} a & ue\_num \leq w \\ b & w < ue\_num \leq x \\ c & x < ue\_num \leq y \\ d & y < ue\_num \leq z \end{cases}$$

$$NACK\_rate = \frac{N\_nack}{e + N\_nack + N\_ack}$$

In the formula, MCQI indicates a processed CQI (denoted as a CQI#3 for ease of understanding), SINR indicates the SINR of the channel #A, ue_num indicates the quantity K of the terminal devices, N_ack indicates the quantity of the acknowledgement messages, N_nack indicates the quantity of the negative acknowledgement messages, a, b, c, d, and e are preset constants, value ranges of a, b, c, and d may be (0, 1], a relationship between a, b, c, and d may be a>b>c>d, and w, x, y, and z may be preset positive integers.

Manner 1c

Another example of the preset rule may be processing, according to the quantity K of the terminal devices and a count of decoding iterations performed by the terminal device #1 on the downlink data, the CQI fed back by the terminal device #1, that is:

Optionally, the method further includes:

receiving fourth indicator information sent by the first terminal device, where the fourth indicator information is used to indicate a first decoding iteration count, where the first decoding iteration count is a count of decoding iterations performed when the first terminal device performs decoding processing on the downlink data; and the processing, according to the quantity K of the terminal devices, the CQI fed back by the first terminal device includes:

processing, according to the quantity K of the terminal devices and the first decoding iteration count, the CQI fed back by the first terminal device.

Specifically, the terminal device #1 and the network device may transmit CQI#1 information in a manner similar to the manner 1a.

In addition, in this embodiment of the present disclosure, the terminal device #1 may decode the downlink data by means of multiple iterations. A method for performing decoding in the iterative manner may be turbo decoding, SCMA decoding, or the like. In addition, a specific implementation process of the method for performing decoding in the iterative manner may be similar to that in the prior art. Herein for avoiding repetition, a detailed description thereof is omitted. In addition, descriptions about similar cases are omitted hereinafter.

In addition, the terminal device #1 may send the decoding iteration count to the network device (by using the fourth indicator information).

Therefore, the network device may process the CQI#1 according to the quantity K of the terminal devices and the decoding iteration count.

For example, the network device may process the CQI#1 based on the following formula 3.

$$MCQI = SINR \times \text{ue\_factor} + \frac{0.1 - x}{1 - 0.1} \times 0.1 \qquad \text{formula 3}$$

$$\text{ue\_factor} = \begin{cases} a & \text{ue\_num} \leq w \\ b & w < \text{ue\_num} \leq x \\ c & x < \text{ue\_num} \leq y \\ d & y < \text{ue\_num} \leq z \end{cases}$$

$$x = \begin{cases} f & 1 \leq m' < 2 \\ g & 2 \leq m' < 3 \\ h & 3 \leq m' < 4 \\ i & 4 \leq m' \leq 5 \end{cases}$$

In the formula, MCQI indicates a processed CQI (denoted as a CQI#4 for ease of understanding), SINR indicates the SINR of the channel #A, ue_num indicates the quantity K of the terminal devices, m' indicates the decoding iteration count, a, b, c, d, e, f, g, h, and i are preset constants, value ranges of a, b, c, and d may be (0, 1], a relationship between a, b, c, and d may be a>b>c>d, f, g, h, and i may be numeric values greater than or equal to 1, a relationship between f, g, h, and i may be i>h>g>f, and w, x, y, and z may be preset positive integers.

Manner 1d

Still another example of the preset rule may be processing, according to the quantity K of the terminal devices, quantities of acknowledgement messages and negative acknowledgement messages that are sent by the terminal device #1 to the network device in an HARQ process for the downlink data, and a count of decoding iterations performed by the terminal device #1 on the downlink data, the CQI fed back by the terminal device #1, that is:

Optionally, the method further includes:

receiving fourth indicator information sent by the first terminal device, where the fourth indicator information is used to indicate a first decoding iteration count, where the first decoding iteration count is a count of decoding iterations performed when the first terminal device performs decoding processing on the downlink data; and determining a quantity of first acknowledgement messages and a quantity of first negative acknowledgement messages, where the first acknowledgement messages are acknowledgement messages sent by the first terminal device to the network device in an HARQ process for the downlink data, and the first negative acknowledgement messages are negative acknowledgement messages sent by the first terminal device to the network device in the HARQ process; and the processing, according to the quantity K of the terminal devices, the CQI fed back by the first terminal device includes:

processing, according to the quantity K of the terminal devices, the first decoding iteration count, the quantity of the first acknowledgement messages, and the quantity of the first negative acknowledgement messages, the CQI fed back by the first terminal device.

Specifically, the terminal device #1 and the network device may transmit CQI#1 information in a manner similar to the manner 1a.

In addition, the network device may determine the quantity of the ACK messages and the quantity of the NACK messages in a manner similar to the manner 1b. The network device may determine the decoding iteration count in a manner similar to the manner 1c.

Therefore, the network device may process, according to the quantity K of the terminal devices, the decoding iteration count, the determined quantity of the ACK messages, and the determined quantity of the NACK messages, the CQI fed back by the terminal device #1.

For example, the CQI#1 may be processed based on the following formula 4.

$$MCQI = SINR \times \text{ue\_factor} + \frac{0.1 - \text{Just\_rate}}{1 - 0.1} \times 0.1 \qquad \text{formula 4}$$

$$\text{ue\_factor} = \begin{cases} a & \text{ue\_num} \leq w \\ b & w < \text{ue\_num} \leq x \\ c & x < \text{ue\_num} \leq y \\ d & y < \text{ue\_num} \leq z \end{cases}$$

$$\text{Just\_rate} = \text{NACK\_rate} \cdot x$$

$$x = \begin{cases} f & 1 \leq m' < 2 \\ g & 2 \leq m' < 3 \\ h & 3 \leq m' < 4 \\ i & 4 \leq m' \leq 5 \end{cases}$$

$$\text{NACK\_rate} = \frac{\text{N\_nack}}{e + \text{N\_nack} + \text{N\_ack}}$$

In the formula, MCQI indicates a processed CQI (denoted as a CQI#5 for ease of understanding), SINR indicates the SINR of the channel #A, ue_num indicates the quantity K of the terminal devices, N_ack indicates the quantity of the acknowledgement messages, N_nack indicates the quantity of the negative acknowledgement messages, m' indicates the decoding iteration count, a, b, c, d, e, f, g, h, and i are preset constants, value ranges of a, b, c, and d may be (0, 1], a relationship between a, b, c, and d may be a>b>c>d, f, g, h, and i may be numeric values greater than or equal to 1, a relationship between f, g, h, and i may be i>h>g>f, and w, x, y, and z may be preset positive integers.

Therefore, the network device may perform update processing on the initial MCS according to a numeric value of the processed CQI. In this embodiment of the present disclosure, the update processing process may be similar to that in the prior art. For example, when the numeric value of the processed CQI is greater than a specific threshold, the MCS is increased, or when the numeric value of the processed CQI is less than a specific threshold, the MCS is decreased, and the changed MCS is delivered to the terminal device #1.

Figure 3:
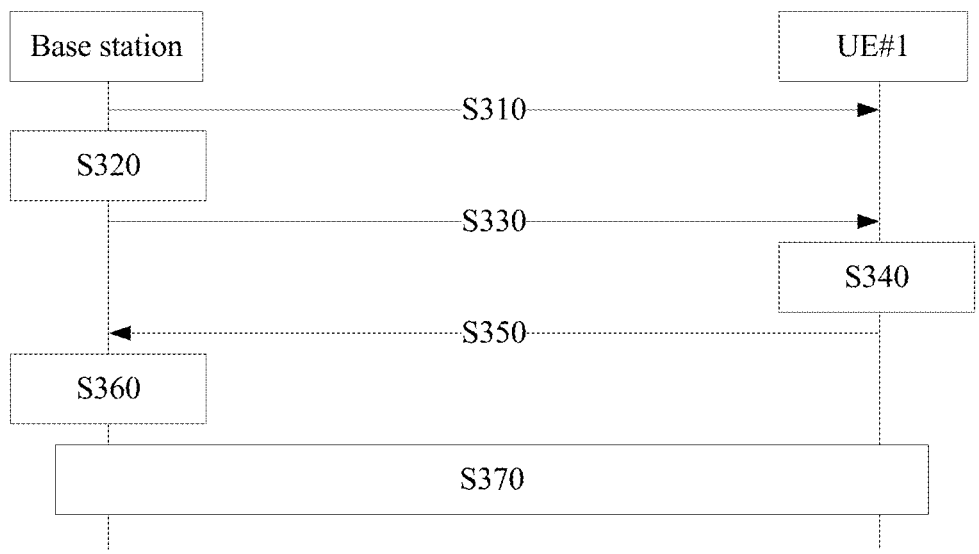
FIG. 3 is a schematic interaction diagram of a method for determining a Modulation and Coding scheme according to an embodiment of the present disclosure.

FIG. 3 shows a schematic diagram of interaction between a network device and a terminal device #1 in this embodiment of the present disclosure corresponding to the manner 1. As shown in FIG. 3, in step S310, the network device delivers information used for performing decoding processing to the terminal device #1, for example, the foregoing downlink transmission information including the foregoing initial MCS.

In step S320, the network device performs coding processing to generate downlink data.

In step S330, the network device sends the downlink data to the terminal device #1.

In step S340, the terminal device #1 determines an SINR of a channel used for transmitting the downlink data (for example, the foregoing channel #A), and performs decoding on the downlink data. Optionally, the terminal device #1 may further record a decoding iteration count.

In step S350, the terminal device #1 feeds back a CQI corresponding to the SINR of the channel #A to the network device. Optionally, the terminal device #1 may further feed back the decoding iteration count.

In step S360, the network device processes, based on a quantity K of terminal devices including the terminal device #1 and reusing a time-frequency resource block #A, the CQI fed back by the terminal device #1.

Optionally, the network device may further process, based on the quantity K of the terminal devices, and a quantity of ACK messages and a quantity of NACK messages in an HARQ process, the CQI fed back by the terminal device #1.

Optionally, the network device may further process, based on the quantity K of the terminal devices and a decoding iteration count fed back by the terminal device #1, the CQI fed back by the terminal device #1.

Optionally, the network device may further process, based on the quantity K of the terminal devices, a quantity of ACK messages and a quantity of NACK messages in an HARQ process, and a decoding iteration count fed back by the terminal device #1, the CQI fed back by the terminal device #1.

In step S370, the network device may further perform, according to the processed CQI, update processing on the MCS determined in step S310, for example, if the processed CQI is greater than a preset threshold, increase the MCS and deliver the changed MCS to the terminal device #1.

Manner 2

According to different preset rules used (or parameters used) by the terminal device #1 for determining the CQI, the manner 2 may be classified into a manner 2a, a manner 2b, a manner 2c, and a manner 2d.

Manner 2a

An example of the preset rule may be processing the CQI according to the quantity K of the terminal devices.

Optionally, the obtaining a CQI includes:

sending first indicator information to the first terminal device, where the first indicator information is used to indicate the quantity K of the terminal devices; and receiving second indicator information sent by the first terminal device, where the second indicator information is used to indicate the CQI, and the CQI is determined by the first terminal device according to the SINR of the channel and the quantity K of the terminal devices.

Specifically, the network device may send first indicator information to the terminal device #1, where the first indicator information may indicate the quantity K of the terminal devices including the terminal device #1 and reusing the foregoing time-frequency resource block #A to perform downlink transmission.

The terminal device #1 may perform channel estimation on the channel #A according to pilot information (for example, a CRS) carried in the downlink data, and further calculate an SINR of the channel #A and determine a CQI corresponding to the SINR of the channel #A (namely, the foregoing CQI#1). The process may be similar to that in the prior art. Herein for avoiding repetition, a detailed description thereof is omitted.

Therefore, the terminal device #1 may process the CQI#1 according to the quantity K of the terminal devices. The processing process may be similar to a process in which the network device processes the CQI#1 to determine a CQI#2. Afterward, the terminal device #1 may send the processed CQI to the network device by using second indicator information.

Manner 2b

Still another example of the preset rule may be processing the CQI according to the quantity K of the terminal devices, and quantities of acknowledgement messages and negative acknowledgement messages that are sent by the terminal device #1 to the network device in an HARQ process for the downlink data, that is:

Optionally, the obtaining a CQI includes:

sending first indicator information to the first terminal device, where the first indicator information is used to indicate the quantity K of the terminal devices; and receiving second indicator information sent by the first terminal device, where the second indicator information is used to indicate the CQI, and the CQI is determined by the first terminal device according to the SINR of the channel, the quantity K of the terminal devices, a quantity of first acknowledgement messages, and a quantity of first negative acknowledgement messages, where the first acknowledgement messages are acknowledgement messages sent by the first terminal device to the network device in a hybrid automatic repeat request HARQ process for the downlink data, and the first negative acknowledgement messages are negative acknowledgement messages sent by the first terminal device to the network device in the HARQ process.

Specifically, the network device may send first indicator information to the terminal device #1, where the first indicator information may indicate the quantity K of the terminal devices including the terminal device #1 and reusing the foregoing time-frequency resource block #A to perform downlink transmission.

The terminal device #1 may determine the CQI#1 in a manner similar to the manner 2b.

In addition, the terminal device #1 may record a quantity of acknowledgement (ACK) messages sent by the terminal device #1 to the network device and a quantity of negative acknowledgement (NACK) messages sent by the terminal device #1 to the network device in the HARQ process in the process of transmitting the downlink data with the network device.

Therefore, the terminal device #1 may process the CQI#1 according to the quantity K of the terminal devices, the quantity of the ACK messages, and the quantity of the NCK messages. The processing process may be similar to a process in which the network device processes the CQI#1 to determine a CQI#3. Afterward, the terminal device #1 may send the processed CQI to the network device by using second indicator information.

Manner 2c

Still another example of the preset rule may be processing the CQI according to the quantity K of the terminal devices and a count of decoding iterations performed by the terminal device #1 on the downlink data, that is:

Optionally, the obtaining a CQI includes:

sending first indicator information to the first terminal device, where the first indicator information is used to indicate the quantity K of the terminal devices; and receiving second indicator information sent by the first terminal device, where the second indicator information is used to indicate the CQI, and the CQI is determined by the first terminal device according to the SINR of the channel, the quantity K of the terminal devices, and a first decoding iteration count, where the first decoding iteration count is a count of decoding iterations performed when the first terminal device performs decoding processing on the downlink data.

Specifically, the network device may send first indicator information to the terminal device #1, where the first indicator information may indicate the quantity K of the terminal devices including the terminal device #1 and reusing the foregoing time-frequency resource block #A to perform downlink transmission.

The terminal device #1 may determine the CQI#1 in a manner similar to the manner 2b.

In addition, in this embodiment of the present disclosure, the terminal device #1 may decode the downlink data by means of multiple iterations. A method for performing decoding in the iterative manner may be turbo decoding, SCMA decoding, or the like. Therefore, the terminal device #1 can determine the decoding iteration count.

Therefore, the terminal device #1 may process the CQI#1 according to the quantity K of the terminal devices and the decoding iteration count. The processing process may be similar to a process in which the network device processes the CQI#1 to determine a CQI#4. Afterward, the terminal device #1 may send the processed CQI to the network device by using second indicator information.

Manner 2d

Still another example of the preset rule may be processing the CQI according to the quantity K of the terminal devices, a count of decoding iterations performed by the terminal device #1 on the downlink data, and quantities of acknowledgement messages and negative acknowledgement messages that are sent by the terminal device #1 to the network device in an HARQ process for the downlink data, that is:

Optionally, the obtaining a CQI includes:

sending first indicator information to the first terminal device, where the first indicator information is used to indicate the quantity K of the terminal devices; and receiving second indicator information sent by the first terminal device, where the second indicator information is used to indicate the CQI, and the CQI is determined by the first terminal device according to the SINR of the channel, the quantity K of the terminal devices, a quantity of first acknowledgement messages, and a quantity of first negative acknowledgement messages, where the first acknowledgement messages are acknowledgement messages sent by the first terminal device to the network device in a hybrid automatic repeat request HARQ process for the downlink data, and the first negative acknowledgement messages are negative acknowledgement messages sent by the first terminal device to the network device in the HARQ process.

Specifically, the network device may send first indicator information to the terminal device #1, where the first indicator information may indicate the quantity K of the terminal devices including the terminal device #1 and reusing the foregoing time-frequency resource block #A to perform downlink transmission.

The terminal device #1 may determine the CQI#1 in a manner similar to the manner 2b.

In addition, in this embodiment of the present disclosure, the terminal device #1 may decode the downlink data by means of multiple iterations. A method for performing decoding in the iterative manner may be turbo decoding, SCMA decoding, or the like. Therefore, the terminal device #1 can determine the decoding iteration count.

In addition, the terminal device #1 may record a quantity of acknowledgement (ACK) messages sent by the terminal device #1 to the network device and a quantity of negative acknowledgement (NACK) messages sent by the terminal device #1 to the network device in the HARQ process in the process of transmitting the downlink data with the network device.

Therefore, the terminal device #1 may process the CQI#1 according to the quantity K of the terminal devices, the decoding iteration count, the quantity of the ACK messages, and the quantity of the NCK messages. The processing process may be similar to a process in which the network device processes the CQI#1 to determine a CQI#5. Afterward, the terminal device #1 may send the processed CQI to the network device by using second indicator information.

Therefore, the network device may obtain the CQI that is determined by the terminal device #1 based on the quantity K of the terminal devices, and may perform update processing on the MCS according to the CQI. In this embodiment of the present disclosure, the update processing process may be similar to that in the prior art, for example, when a numeric value of the CQI is greater than (or less than) a specific threshold, increase (or decrease) the MCS and deliver the changed MCS to the terminal device #1.

FIG. 4 shows a schematic diagram of interaction between a network device and a terminal device #1 in this embodiment of the present disclosure corresponding to the manner 2. As shown in FIG. 4, in step S410, the network device delivers information used for performing decoding processing to the terminal device #1, for example, the foregoing downlink transmission information, where the downlink transmission information includes the foregoing initial MCS and a quantity K of terminal devices including the terminal device #1 and reusing a time-frequency resource block #A.

In step S420, the network device performs coding processing to generate downlink data.

In step S430, the network device sends the downlink data to the terminal device #1.

In step S440, the terminal device #1 determines an SINR of a channel used for transmitting the downlink data (for example, the foregoing channel #A), determines a CQI corresponding to the SINR of the channel #A, and may process the CQI according to the quantity K of the terminal devices including the terminal device #1 and reusing the time-frequency resource block #A.

Optionally, the terminal device #1 may further process the CQI based on the quantity K of the terminal devices, and a quantity of ACK messages and a quantity of NACK messages in an HARQ process.

Optionally, the terminal device #1 may further process the CQI based on the quantity K of the terminal devices and a decoding iteration count.

Optionally, the terminal device #1 may further process the CQI based on the quantity K of the terminal devices, a quantity of ACK messages and a quantity of NACK messages in an HARQ process, and a decoding iteration count.

In step S450, the terminal device #1 sends the processed CQI to the network device.

In step S460, the network device performs, according to the processed CQI, update processing on the MCS determined in step S410.

It should be understood that, the process illustrated above in which the terminal device #1 processes the CQI determined based on the SINR of the channel is merely an example. The present disclosure is not limited thereto. For example, a mapping relationship entry may be pre-stored in the terminal device #1, where the mapping relationship entry may record a one-to-one mapping relationship between a plurality of parameter sets and a plurality of CQIs, and the plurality of parameter sets may include one terminal device quantity value and one SINR value (or a CQI value corresponding to an SINR value). Therefore, after determining the quantity K of the terminal devices and the SINR of the channel, the terminal device #1 directly finds a corresponding CQI according to the mapping relationship entry, and uses the CQI as the processed CQI.

In addition, in this embodiment of the present disclosure, a form of the mapping relationship entry may be determined according to a requirement. For example, the terminal device quantity value and the SINR value may be used as two items in the entry and recorded in the mapping relationship entry (for example, as two rows or two columns in the entry). Alternatively, a plurality of entries may be formed, where each entry records a mapping relationship between an SINR value and a CQI, and the plurality of entries should have a mapping relationship with a plurality of terminal device quantity values. That is, the terminal device may find, by using the determined terminal device quantity value, an entry corresponding to the terminal device quantity value and used to determine a CQI based on an SINR value.

In a conventional method for determining a modulation and coding order, adjustment is performed according to only an SINR value of a link (the link is based on a time-frequency resource block including a plurality of REs) or a quantized value of a CQI corresponding to an SINR value. However, in the SCMA system, a plurality of terminal devices reuses a same time-frequency resource block to perform data transmission. Because interference may exist between the plurality of terminal devices, the network device can obtain only an SINR value of the time-frequency resource block, but cannot obtain a respective SINR value of each terminal device in the plurality of terminal devices reusing the time-frequency resource block. Consequently, the conventional method for determining a Modulation and Coding scheme cannot be effectively implemented in the SCMA system.

In contrast, according to the method for determining a Modulation and Coding scheme in this embodiment of the present disclosure, K terminal devices reuse a same time-frequency resource in a same time period to perform data transmission with a network device; data is transmitted between a first terminal device and the network device through a channel based on the time-frequency resource, and a CQI determined based on a signal to interference plus noise ratio of the channel is processed according to the quantity K of the terminal devices, so that a processed CQI can reflect interference noise in the data transmission process of the first terminal device; and a Modulation and Coding scheme of the first terminal device is adjusted according to the processed CQI, so that an adjusted Modulation and Coding scheme can adapt to the interference noise of the first terminal device. Therefore, the method is applicable to adjustment of a Modulation and Coding scheme for terminal devices that reuse a same time-frequency resource to perform data transmission.

FIG. 5 shows a schematic flowchart of a method 500 for determining a Modulation and Coding scheme according to another embodiment of the present disclosure, where the method is described from a perspective of a network device. The method 500 is performed by a network device. As shown in FIG. 5, the method 500 includes:

S510. Determine a quantity K of terminal devices that reuse a first time-frequency resource in a first time period to receive downlink data from the network device, where K≥2.

S520. Receive first indicator information sent by the first terminal device, where the first indicator information is used to indicate a channel quality indicator CQI, the CQI is determined by the first terminal device according to an SINR of a channel, the channel is a channel based on the first time-frequency resource, and the channel is used to transmit downlink data between the first terminal device and the network device in the first time period.

S530. Determine, according to preset mapping relationship information, a Modulation and Coding scheme MCS corresponding to a value of the quantity K of the terminal devices and a value of the CQI, and use the MCS as an MCS of the first terminal device, where the mapping relationship information is used to indicate a one-to-one mapping relationship between N parameter sets and N MCSs, each parameter set includes a terminal device quantity value and a CQI value, and N≥2.

The method 500 may be applied to downlink transmission. As described above, the network device may determine to use, in a same time period (including the first time period, hereinafter denoted as a time period #A for ease of understanding and distinguishing), a same time-frequency resource (for example, in SCMA mode) to perform data transmission with K terminal devices including a terminal device #1.

The network device may determine downlink transmission information for the terminal device #1, where the downlink transmission information includes the following information:

a codebook used by the terminal device #1 in the time period #A (namely, an example of the first time period) to perform downlink transmission;

a time-frequency resource block #A used by the terminal device #1 in the time period #A to perform downlink transmission, where the time-frequency resource block #A includes a plurality of REs (for example, corresponding to a same symbol and corresponding to different subcarriers), where a plurality of terminal devices including the terminal device #1 reuses the time-frequency resource block #A to perform downlink transmission; and an initial MCS used by the terminal device #1 in the time period #A to perform downlink transmission.

In addition, the network device may transmit the downlink transmission information to the terminal device #1, for example, through a control channel or a broadcast channel.

It should be understood that, the downlink transmission information illustrated above is merely an example. The present disclosure is not limited thereto. In conventional SCMA, all other information used for downlink transmission and delivered to the terminal device by the network device before downlink transmission is performed shall fall within the protection scope of the present disclosure. Hereinafter for avoiding repetition, detailed descriptions about similar cases are omitted.

Therefore, the terminal device #1 can determine, according to the downlink transmission information, a position (including a time-domain position and a frequency-domain position) of the time-frequency resource block #A carrying downlink data, and the initial MCS used when decoding processing is performed on the downlink transmission data.

Afterward, the network device may perform, according to the determined initial MCS, coding processing on data that needs to be transmitted to the terminal device #1 (for example, an original bit sequence), to generate downlink data (namely, an example of data), and transmit the downlink data to the terminal device #1 through a channel #A based on the time-frequency resource block #A (namely, an example of a channel) in the time period #A.

The terminal device #1 can receive the downlink data through the channel #A in the time period #A, and perform decoding processing on the downlink data by using the initial MCS, to restore the downlink data to the data existing before the network device performs coding processing (for example, the original bit sequence).

It should be noted that, in this embodiment of the present disclosure, the coding processing by the network device, the decoding processing by the terminal device #1, and the transmission process of the downlink data may be similar to those in the prior art. Herein for avoiding repetition, detailed descriptions thereof are omitted.

The terminal device #1 may perform channel estimation on the channel #A according to pilot information carried in the downlink data, for example, a cell-specific reference signal (CRS), further calculate an SINR of the channel #A, so as to send, to the network device by using first indicator information, a CQI value corresponding to the SINR of the channel #A.

It should be understood that, the method and process illustrated above for determining the SINR of the channel #A by the terminal device #1 are merely examples, and are not particularly limited in the present disclosure, and may also be similar to those in another prior art used by the terminal device to determine the SINR of the channel. Herein for avoiding repetition, detailed descriptions thereof are omitted. In addition, descriptions about similar cases are omitted hereinafter.

The network device may obtain mapping relationship information, where the mapping relationship information indicates a mapping relationship between a plurality of first information groups and a plurality of MCSs (hereinafter denoted as a mapping relationship #1 for ease of understanding and distinguishing), and the plurality of first information groups corresponds to the plurality of MCSs on a one-to-one basis, where a first information group includes a numeric value of a terminal device quantity and a CQI value (or an SINR value corresponding to the CQI value), and at least one value of the two numeric values included is different in different first information groups.

In this embodiment of the present disclosure, the mapping relationship may be obtained by a telecommunications operator or a network manager by collecting statistics in a manner of experiment or the like. In addition, the mapping relationship may be recorded as a correspondence entry and stored in a storage device of the network device, or may be expressed as a formula and stored as a software program in a storage device of the network device. This is not particularly limited in the present disclosure.

Optionally, the mapping relationship information is specifically a mapping relationship entry that records the one-to-one mapping relationship between the N parameter sets and the N MCSs.

Specifically, the mapping relationship #1 may be reflected as a mapping relationship entry (hereinafter denoted as a mapping relationship entry #1 for ease of understanding and distinguishing). For example, in the mapping relationship entry #1, the CQI value and the terminal device quantity value may be used as a row or a column of the entry, so that the network device can find, from the mapping relationship entry #1, the MCS corresponding to the quantity K of the terminal devices and the SINR of the channel #A.

Optionally, each parameter set further includes a decoding iteration count value;

the method further includes:

receiving second indicator information sent by the first terminal device, where the second indicator information is used to indicate a first decoding iteration count, where the first decoding iteration count is a count of decoding iterations performed when the first terminal device performs decoding processing on the downlink data; and the determining, according to preset mapping relationship information, an MCS corresponding to a value of the quantity K of the terminal devices and a value of the CQI includes:

determining, according to the preset mapping relationship information, an MCS corresponding to the value of the quantity K of the terminal devices, the value of the CQI, and the first decoding iteration count value.

Specifically, the network device may obtain mapping relationship information, where the mapping relationship information indicates a mapping relationship between a plurality of second information groups and a plurality of MCSs (hereinafter denoted as a mapping relationship #2 for ease of understanding and distinguishing), and the plurality of second information groups corresponds to the plurality of MCSs on a one-to-one basis, where a second information group includes a numeric value of a user equipment quantity, a CQI value (or an SINR value corresponding to the CQI value), and a numeric value of a decoding iteration count, and at least one value of the three numeric values is different in different second information groups.

Similarly, the mapping relationship #2 may be reflected as a mapping relationship entry (hereinafter denoted as a mapping relationship entry #2 for ease of understanding and distinguishing). For example, in the mapping relationship entry #2, the CQI value, the terminal device quantity value, and the numeric value of the decoding iteration count may be used as a row or a column of the entry.

In addition, in this embodiment of the present disclosure, the terminal device #1 may decode the downlink data by means of multiple iterations. A method for performing decoding in the iterative manner may be turbo decoding, SCMA decoding, or the like. Therefore, the terminal device #1 can determine the decoding iteration count, and transmit the decoding iteration count to the network device.

Therefore, the network device may find the entry #2 according to the determined quantity K of the terminal devices, the CQI value, and the decoding iteration count, and use the MCS corresponding to the quantity K of the terminal devices, the CQI value corresponding to the SINR of the channel #A, and the decoding iteration count, as the MCS of the terminal device #1.

Optionally, each parameter set further includes a value of a quantity of acknowledgement messages and a value of a quantity of negative acknowledgement messages;

the method further includes:

determining a quantity of first acknowledgement messages and a quantity of first negative acknowledgement messages, where the first acknowledgement messages are acknowledgement messages sent by the first terminal device to the network device in a hybrid automatic repeat request HARQ process for the downlink data, the first negative acknowledgement messages are negative acknowledgement messages sent by the first terminal device to the network device in the HARQ process, and the adjustment policy information further includes the quantity of the first acknowledgement messages and the quantity of the first negative acknowledgement messages; and the determining, according to preset mapping relationship information, an MCS corresponding to a value of the quantity K of the terminal devices and a value of the CQI includes:

determining, according to the preset mapping relationship information, an MCS corresponding to the value of the quantity K of the terminal devices, the value of the CQI, the quantity of the first acknowledgement messages, and the quantity of the first negative acknowledgement messages.

Specifically, the terminal device may obtain mapping relationship information, where the mapping relationship information indicates a mapping relationship between a plurality of third information groups and a plurality of MCSs (hereinafter denoted as a mapping relationship #3 for ease of understanding and distinguishing), and the plurality of third information groups corresponds to the plurality of MCSs on a one-to-one basis, where a third information group includes a numeric value of a terminal device quantity, a CQI value (or an SINR value corresponding to the CQI value), a numeric value of a quantity of ACK messages, and a numeric value of a quantity of NACK messages, and at least one value of the four numeric values is different in different third information groups.

Similarly, the mapping relationship #3 may be reflected as a mapping relationship entry (hereinafter denoted as a mapping relationship entry #3 for ease of understanding and distinguishing). For example, in the mapping relationship entry #3, the CQI value, the terminal device quantity value, the numeric value of the quantity of the ACK messages, and the numeric value of the quantity of the NACK messages may be used as a row or a column of the entry.

In addition, the terminal device #1 may record a quantity of acknowledgement (ACK) messages sent by the terminal device #1 to the network device and a quantity of negative acknowledgement (NACK) messages sent by the terminal device #1 to the network device in the HARQ process in the process of transmitting the downlink data with the network device.

Therefore, the network device may find the corresponding MCS from the mapping relationship entry #3 according to the determined quantity K of the terminal devices, the CQI value, the quantity of the ACK messages, and the quantity of the NACK messages.

Optionally, each parameter set further includes a decoding iteration count value, a value of a quantity of acknowledgement messages, and a value of a quantity of negative acknowledgement messages;

the method further includes:

receiving second indicator information sent by the first terminal device, where the second indicator information is used to indicate a first decoding iteration count, where the first decoding iteration count is a count of decoding iterations performed when the first terminal device performs decoding processing on the downlink data; and determining a quantity of first acknowledgement messages and a quantity of first negative acknowledgement messages, where the first acknowledgement messages are acknowledgement messages sent by the first terminal device to the network device in an HARQ process for the downlink data, the first negative acknowledgement messages are negative acknowledgement messages sent by the first terminal device to the network device in the HARQ process, and the adjustment policy information further includes the quantity of the first acknowledgement messages and the quantity of the first negative acknowledgement messages; and the determining, according to preset mapping relationship information, an MCS corresponding to a value of the quantity K of the terminal devices and a value of the CQI includes:

determining, according to the preset mapping relationship information, an MCS corresponding to the value of the quantity K of the terminal devices, the value of the CQI, the first decoding iteration count value, the quantity of the first acknowledgement messages, and the quantity of the first negative acknowledgement messages.

Specifically, the terminal device may obtain mapping relationship information, where the mapping relationship information indicates a mapping relationship between a plurality of fourth information groups and a plurality of MCSs (hereinafter denoted as a mapping relationship #4 for ease of understanding and distinguishing), and the plurality of fourth information groups corresponds to the plurality of MCSs on a one-to-one basis, where a fourth information group includes a numeric value of a terminal device quantity, a CQI value (or an SINR value corresponding to the CQI value), a decoding iteration count value, a numeric value of a quantity of ACK messages, and a numeric value of a quantity of NACK messages, and at least one value of the five numeric values is different in different fourth information groups.

Similarly, the mapping relationship #4 may be reflected as a mapping relationship entry (hereinafter denoted as a mapping relationship entry #4 for ease of understanding and distinguishing). For example, in the mapping relationship entry #4, the CQI value, the terminal device quantity value, the decoding iteration count, the numeric value of the quantity of the ACK messages, and the numeric value of the quantity of the NACK messages may be used as a row or a column of the entry.

Therefore, the network device can find, from the mapping relationship entry #4, the MCS corresponding to the quantity K of the terminal devices, the CQI value corresponding to the SINR of the channel #A, the decoding iteration count, the quantity of the ACK messages, and the quantity of the NACK messages, and use the MCS as the MCS of the terminal device #1.

In addition, in this embodiment of the present disclosure, a form of the mapping relationship entry may be determined according to a requirement. For example, the terminal device quantity value and the SINR value may be used as two items in the entry and recorded in the mapping relationship entry (for example, as two rows or two columns in the entry). Alternatively, a plurality of entries may be formed, where each entry records a mapping relationship between an SINR value and a CQI, and the plurality of entries should have a mapping relationship with a plurality of terminal device quantity values. That is, the terminal device may find, by using the determined terminal device quantity value, an entry corresponding to the terminal device quantity value and used to determine a CQI based on an SINR value.

In a conventional method for determining a modulation and coding order, adjustment is performed according to only an SINR value of a link (the link is based on a time-frequency resource block including a plurality of REs) or a quantized value of a CQI corresponding to an SINR value. However, in the SCMA system, a plurality of terminal devices reuses a same time-frequency resource block to perform data transmission. Because interference may exist between the plurality of terminal devices, the network device can obtain only an SINR value of the time-frequency resource block, but cannot obtain a respective SINR value of each terminal device in the plurality of terminal devices reusing the time-frequency resource block. Consequently, the conventional method for determining a Modulation and Coding scheme cannot be effectively implemented in the SCMA system.

In contrast, according to the method for determining a Modulation and Coding scheme in this embodiment of the present disclosure, K terminal devices reuse a same time-frequency resource in a same time period to perform data transmission with a network device; data is transmitted between a first terminal device and the network device through a channel based on the time-frequency resource; and an MCS is determined according to the quantity K of the terminal devices and a CQI determined based on a signal to interference plus noise ratio of the channel, so that the MCS can reflect interference noise in the data transmission process of the first terminal device, and that an adjusted Modulation and Coding scheme can adapt to the interference noise of the first terminal device. Therefore, the method is applicable to adjustment of a Modulation and Coding scheme for terminal devices that reuse a same time-frequency resource to perform data transmission.

The foregoing illustrates a process in which the method for determining a Modulation and Coding scheme according to the present disclosure is applied to downlink transmission. However, the present disclosure is not limited thereto, and the method may also be applied to uplink transmission.

In this case, the network device may determine uplink transmission information for the terminal device #1, where the uplink transmission information includes the following information:

a codebook used by the terminal device #1 to perform uplink transmission in a time period #B;

a time-frequency resource block #B used by the terminal device #1 to perform uplink transmission in the time period #B, where the time-frequency resource block #B includes a plurality of REs (for example, corresponding to a same symbol and corresponding to different subcarriers), where a plurality of terminal devices including the terminal device #1 reuses the time-frequency resource block #B to perform uplink transmission; and an initial MCS used by the terminal device #1 to perform uplink transmission in the time period #B.

In addition, the network device may transmit the uplink transmission information to the terminal device #1, for example, through a control channel or a broadcast channel.

Therefore, the terminal device #1 can determine, according to the uplink transmission information, a position (including a time-domain position and a frequency-domain position) of the time-frequency resource block #B carrying uplink data, and the initial MCS used when coding processing is performed on the uplink transmission data.

Afterward, the terminal device #1 may perform, according to the determined initial MCS, coding processing on data that needs to be transmitted to the network device, to generate uplink data, and send the uplink data to the network device through a channel #B based on the time-frequency resource block #B in the time period #B.

The network device can receive the uplink data through the channel #B in the time period #B, and perform decoding processing on the uplink data by using the initial MCS, to restore the uplink data to the data existing before the network device performs coding processing.

The network device may obtain mapping relationship information, for example, the mapping relationship #1 or the formula 1.

In addition, the network device may perform channel estimation on the channel #B according to pilot information carried in the uplink data, for example, a demodulation reference signal (DMRS), to further calculate an SINR of the channel #B.

Therefore, the network device may determine, according to the mapping relationship #1 or the formula 1, an MCS corresponding to a CQI of the channel #B (or an SINR corresponding to the CQI) and the quantity K of the terminal devices reusing the time-frequency resource block #B to perform uplink transmission, and use the MCS as the MCS of the terminal device #1.

Similarly, the network device may also determine the MCS of the terminal device #1 according to the mapping relationship #2 or the formula 2, the mapping relationship #3 or the formula 3, or the mapping relationship #4 or the formula 4.

FIG. 6 shows a schematic diagram of interaction between a network device and a terminal device #1 in this embodiment of the present disclosure corresponding to uplink transmission. As shown in FIG. 6, in step S610, the network device delivers information used for performing coding processing to the terminal device #1, for example, the foregoing uplink transmission information including the foregoing initial MCS.

In step S620, the terminal device #1 performs coding processing to generate uplink data.

In step S630, the terminal device #1 sends the uplink data to the network device.

In step S640, the network device determines an SINR of a channel (for example, the foregoing channel #B) used for transmitting the uplink data, and performs decoding and decoding processing on the uplink data. In addition, the network device determines an MCS based on, for example, the foregoing pre-stored mapping relationship #1 or formula 1.

In step S650, the network device and the terminal device #1 may perform data transmission according to the determined MCS as described above.

FIG. 7 shows a schematic flowchart of a method 700 for determining a Modulation and Coding scheme according to an embodiment of the present disclosure, where the method is described from a perspective of a terminal device (for example, a terminal device #1). The method 700 is performed by a first terminal device in K terminal devices. As shown in FIG. 7, the method 700 includes:

S710. Determine a signal to interference plus noise ratio SINR of a channel, where the channel is a channel based on a first time-frequency resource, the channel is used to transmit downlink data between the first terminal device and a network device in a first time period, the K terminal devices reuse the first time-frequency resource in the first time period to receive downlink data from the network device, and K≥2.

S720. Receive first indicator information sent by the network device, where the first indicator information is used to indicate the quantity K of the terminal devices.

S730. Determine a channel quality indicator CQI according to the signal to interference plus noise ratio SINR of the channel and the quantity K of the terminal devices.

S740. Send second indicator information to the network device, where the second indicator information is used to indicate the CQI, so that the network device determines a Modulation and Coding scheme MCS of the first terminal device according to the CQI.

Optionally, the determining a CQI according to the signal to interference plus noise ratio SINR of the channel and the quantity K of the terminal devices includes:

determining the CQI according to the SINR of the channel, the quantity K of the terminal devices, and a first decoding iteration count, where the first decoding iteration count is a count of decoding iterations performed when the first terminal device performs decoding processing on the downlink data.

Optionally, the determining a CQI according to the signal to interference plus noise ratio SINR of the channel and the quantity K of the terminal devices includes:

determining the CQI according to the SINR of the channel, the quantity K of the terminal devices, a quantity of first acknowledgement messages, and a quantity of first negative acknowledgement messages, where the first acknowledgement messages are acknowledgement messages sent by the first terminal device to the network device in a hybrid automatic repeat request HARQ process for the downlink data, and the first negative acknowledgement messages are negative acknowledgement messages sent by the first terminal device to the network device in the HARQ process.

Optionally, the determining a CQI according to the signal to interference plus noise ratio SINR of the channel and the quantity K of the terminal devices includes:

determining the CQI according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the first terminal device performs decoding processing on the downlink data, the first acknowledgement messages are acknowledgement messages sent by the first terminal device to the network device in a hybrid automatic repeat request HARQ process for the downlink data, and the first negative acknowledgement messages are negative acknowledgement messages sent by the first terminal device to the network device in the HARQ process.

Optionally, the method is applied to a sparse code multiple access communications system, and the first time-frequency resource is a time-frequency resource block including at least two resource elements REs.

Actions of the first terminal device in the method 700 are similar to actions of the terminal device #1 in the method 200 or method 500. Herein for avoiding repetition, detailed descriptions thereof are omitted.

According to the method for determining a Modulation and Coding scheme in this embodiment of the present disclosure, K terminal devices reuse a same time-frequency resource in a same time period to perform data transmission with a network device; data is transmitted between a first terminal device and the network device through a channel based on the time-frequency resource, and a CQI determined based on a signal to interference plus noise ratio of the channel is processed according to the quantity K of the terminal devices, so that a processed CQI can reflect interference noise in the data transmission process of the first terminal device; and a Modulation and Coding scheme of the first terminal device is adjusted according to the processed CQI, so that an adjusted Modulation and Coding scheme can adapt to the interference noise of the first terminal device. Therefore, the method is applicable to adjustment of a Modulation and Coding scheme for terminal devices that reuse a same time-frequency resource to perform data transmission.

FIG. 8 shows a schematic flowchart of a method 800 for determining a Modulation and Coding scheme according to another embodiment of the present disclosure, where the method is described from a perspective of a terminal device (for example, a terminal device #1). The method 800 is performed by a first terminal device in K terminal devices. As shown in FIG. 8, the method 800 includes:

S810. Determine a signal to interference plus noise ratio SINR of a channel, where the channel is a channel based on a first time-frequency resource, the channel is used to transmit downlink data between the first terminal device and a network device in a first time period, the K terminal devices reuse the first time-frequency resource in the first time period to receive downlink data from the network device, and K≥2.

S820. Determine a channel quality indicator CQI according to the SINR of the channel.

S830. Send first indicator information and second indicator information to the network device, where the first indicator information is used to indicate the CQI, and the second indicator information is used to indicate a first decoding iteration count, where the first decoding iteration count is a count of decoding iterations performed when the first terminal device performs decoding processing on the downlink data, so that the network device determines a Modulation and Coding scheme MCS of the first terminal device according to the quantity K of the terminal devices and the first decoding iteration count.

Optionally, the method is applied to a sparse code multiple access communications system, and the first time-frequency resource is a time-frequency resource block including at least two resource elements REs.

Actions of the first terminal device in the method 800 are similar to actions of the terminal device #1 when the terminal device #1 feeds back the CQI of the channel and feeds back the decoding iteration count in the method 200 or method 500. Herein for avoiding repetition, detailed descriptions thereof are omitted.

According to the method for determining a Modulation and Coding scheme in this embodiment of the present disclosure, K terminal devices reuse a same time-frequency resource in a same time period to perform data transmission with a network device; data is transmitted between a first terminal device and the network device through a channel based on the time-frequency resource, and a CQI determined based on a signal to interference plus noise ratio of the channel is processed according to the quantity K of the terminal devices and a decoding iteration count, so that a processed CQI can reflect interference noise in the data transmission process of the first terminal device; and a Modulation and Coding scheme of the first terminal device is adjusted according to the processed CQI, so that an adjusted Modulation and Coding scheme can adapt to the interference noise of the first terminal device. Therefore, the method is applicable to adjustment of a Modulation and Coding scheme for terminal devices that reuse a same time-frequency resource to perform data transmission.

The foregoing describes in detail methods for determining a Modulation and Coding scheme according to the embodiments of the present disclosure with reference to FIG. 1 to FIG. 8. The following describes in detail apparatuses for determining a Modulation and Coding scheme according to the embodiments of the present disclosure with reference to FIG. 9 to FIG. 12.

Figure 9:
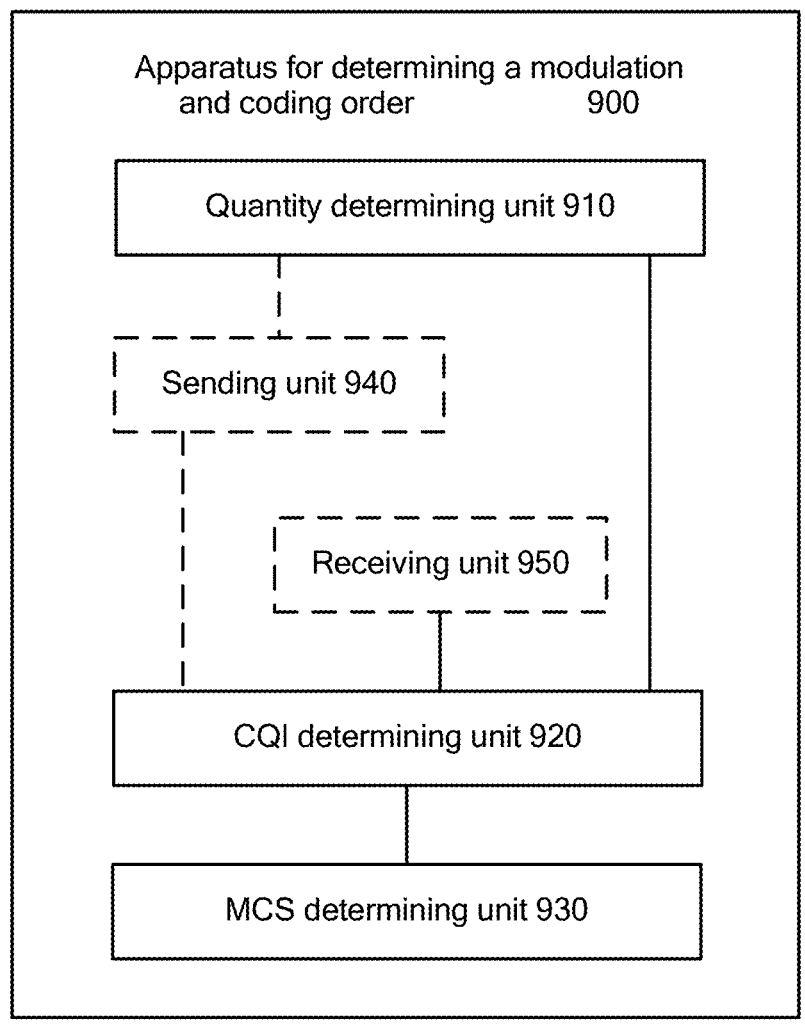
FIG. 9 is a schematic structural diagram of an apparatus for determining a Modulation and Coding scheme according to an embodiment of the present disclosure.

FIG. 9 is a schematic structural diagram of an apparatus 900 for determining a Modulation and Coding scheme according to an embodiment of the present disclosure. As shown in FIG. 9, the apparatus 900 includes:

a quantity determining unit 910, configured to determine a quantity K of terminal devices that reuse a first time-frequency resource in a first time period to perform downlink data transmission with the apparatus, where K≥2;

a CQI determining unit 920, configured to obtain a channel quality indicator CQI, where the CQI is determined according to a signal to interference plus noise ratio SINR of a channel and the quantity K of the terminal devices, where the channel is a channel based on the first time-frequency resource, and the channel is used to transmit downlink data between a first terminal device and the apparatus in the first time period; and an MCS determining unit 930, configured to determine a Modulation and Coding scheme MCS of the first terminal device according to the CQI.

Optionally, the CQI is determined according to the SINR of the channel, the quantity K of the terminal devices, and a first decoding iteration count, where the first decoding iteration count is a count of decoding iterations performed when the first terminal device performs decoding processing on the downlink data.

Optionally, the CQI is determined according to the SINR of the channel, the quantity K of the terminal devices, a quantity of first acknowledgement messages, and a quantity of first negative acknowledgement messages, where the first acknowledgement messages are acknowledgement messages sent by the first terminal device to the apparatus in a hybrid automatic repeat request HARQ process for the downlink data, and the first negative acknowledgement messages are negative acknowledgement messages sent by the first terminal device to the apparatus in the HARQ process.

Optionally, the CQI is determined according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the first terminal device performs decoding processing on the downlink data, the first acknowledgement messages are acknowledgement messages sent by the first terminal device to the apparatus in a hybrid automatic repeat request HARQ process for the downlink data, and the first negative acknowledgement messages are negative acknowledgement messages sent by the first terminal device to the apparatus in the HARQ process.

Optionally, the apparatus further includes:
a sending unit, configured to send first indicator information to the first terminal device, where the first indicator information is used to indicate the quantity K of the terminal devices; and
a receiving unit, configured to receive second indicator information sent by the first terminal device, where the second indicator information is used to indicate the CQI, and the CQI is determined by the first terminal device according to the SINR of the channel and the quantity K of the terminal devices; where
the CQI determining unit is specifically configured to determine the CQI according to the second indicator information.

Optionally, the apparatus further includes:
a sending unit, configured to send first indicator information to the first terminal device, where the first indicator information is used to indicate the quantity K of the terminal devices; and
a receiving unit, configured to receive second indicator information sent by the first terminal device, where the second indicator information is used to indicate the CQI, and the CQI is determined by the first terminal device according to the SINR of the channel, the quantity K of the terminal devices, and a first decoding iteration count, where the first decoding iteration count is a count of decoding iterations performed when the first terminal device performs decoding processing on the downlink data; where
the CQI determining unit is specifically configured to determine the CQI according to the second indicator information.

Optionally, the apparatus further includes:
a sending unit, configured to send first indicator information to the first terminal device, where the first indicator information is used to indicate the quantity K of the terminal devices; and
a receiving unit, configured to receive second indicator information sent by the first terminal device, where the second indicator information is used to indicate the CQI, and the CQI is determined by the first terminal device according to the SINR of the channel, the quantity K of the terminal devices, a quantity of first acknowledgement messages, and a quantity of first negative acknowledgement messages, where the first acknowledgement messages are acknowledgement messages sent by the first terminal device to the apparatus in a hybrid automatic repeat request HARQ process for the downlink data, and the first negative acknowledgement messages are negative acknowledgement messages sent by the first terminal device to the apparatus in the HARQ process; where
the CQI determining unit is specifically configured to determine the CQI according to the second indicator information.

Optionally, the apparatus further includes:
a sending unit, configured to send first indicator information to the first terminal device, where the first indicator information is used to indicate the quantity K of the terminal devices; and
a receiving unit, configured to receive second indicator information sent by the first terminal device, where the second indicator information is used to indicate the CQI, and the CQI is determined by the first terminal device according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the first terminal device performs decoding processing on the downlink data, the first acknowledgement messages are acknowledgement messages sent by the first terminal device to the apparatus in a hybrid automatic repeat request HARQ process for the downlink data, and the first negative acknowledgement messages are negative acknowledgement messages sent by the first terminal device to the apparatus in the HARQ process; where
the CQI determining unit is specifically configured to determine the CQI according to the second indicator information.

Optionally, the apparatus further includes:
a receiving unit, configured to receive third indicator information sent by the first terminal device, where the third indicator information is used to indicate a CQI fed back by the first terminal device, and the CQI fed back by the first terminal device is determined by the first terminal device according to the SINR of the channel; where the CQI determining unit is specifically configured to process, according to the quantity K of the terminal devices, the CQI fed back by the first terminal device, so as to determine the CQI.

Optionally, the receiving unit is further configured to receive fourth indicator information sent by the first terminal device, where the fourth indicator information is used to indicate a first decoding iteration count, where the first decoding iteration count is a count of decoding iterations performed when the first terminal device performs decoding processing on the downlink data; and the CQI determining unit is specifically configured to process, according to the quantity K of the terminal devices and the first decoding iteration count, the CQI fed back by the first terminal device.

Optionally, the CQI determining unit is further configured to determine a quantity of first acknowledgement messages and a quantity of first negative acknowledgement messages, where the first acknowledgement messages are acknowledgement messages sent by the first terminal device to the apparatus in an HARQ process for the downlink data, and the first negative acknowledgement messages are negative acknowledgement messages sent by the first terminal device to the apparatus in the HARQ process; and configured to process, according to the quantity K of the terminal devices, the quantity of the first acknowledgement messages, and the quantity of the first negative acknowledgement messages, the CQI fed back by the first terminal device.

Optionally, the receiving unit is further configured to receive fourth indicator information sent by the first terminal device, where the fourth indicator information is used to indicate a first decoding iteration count, where the first decoding iteration count is a count of decoding iterations performed when the first terminal device performs decoding processing on the downlink data; and the CQI determining unit is further configured to determine a quantity of first acknowledgement messages and a quantity of first negative acknowledgement messages, where the first acknowledgement messages are acknowledgement messages sent by the first terminal device to the apparatus in an HARQ process for the downlink data, and the first negative acknowledgement messages are negative acknowledgement messages sent by the first terminal device to the apparatus in the HARQ process; and configured to process, according to the quantity K of the terminal devices, the first decoding iteration count, the quantity of the first acknowledgement messages, and the quantity of the first negative acknowledgement messages, the CQI fed back by the first terminal device.

Optionally, the apparatus is configured in a sparse code multiple access communications system, and the first time-frequency resource is a time-frequency resource block including at least two resource elements REs.

Optionally, the apparatus is a network device.

The apparatus 900 for determining a Modulation and Coding scheme according to this embodiment of the present disclosure may correspond to a network device (for example, a base station) in a method embodiment of the present disclosure. In addition, each unit, namely, each module, in the apparatus 900 for determining a Modulation and Coding scheme and the foregoing other operations and/or functions are respectively intended to implement the corresponding procedure of the method 200 in FIG. 2. For brevity, details are not described herein again.

According to the apparatus for determining a Modulation and Coding scheme in this embodiment of the present disclosure, K terminal devices reuse a same time-frequency resource in a same time period to perform data transmission with a network device; data is transmitted between a first terminal device and the network device through a channel based on the time-frequency resource, and a CQI determined based on a signal to interference plus noise ratio of the channel is processed according to the quantity K of the terminal devices and a decoding iteration count, so that a processed CQI can reflect interference noise in the data transmission process of the first terminal device; and a Modulation and Coding scheme of the first terminal device is adjusted according to the processed CQI, so that an adjusted Modulation and Coding scheme can adapt to the interference noise of the first terminal device. Therefore, the apparatus is applicable to adjustment of a Modulation and Coding scheme for terminal devices that reuse a same time-frequency resource to perform data transmission.

Figure 10:
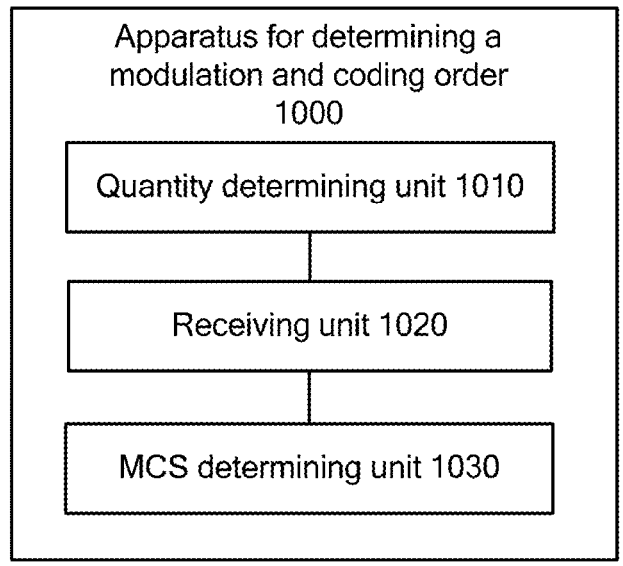
FIG. 10 is a schematic structural diagram of an apparatus for determining a Modulation and Coding scheme according to another embodiment of the present disclosure.

FIG. 10 is a schematic structural diagram of an apparatus 1000 for determining a Modulation and Coding scheme according to an embodiment of the present disclosure. As shown in FIG. 10, the apparatus 1000 includes:

a quantity determining unit 1010, configured to determine a quantity K of terminal devices that reuse a first time-frequency resource in a first time period to perform downlink data transmission with the apparatus, where K≥2;

a receiving unit 1020, configured to receive first indicator information sent by the first terminal device, where the first indicator information is used to indicate a channel quality indicator CQI, the CQI is determined by the first terminal device according to an SINR of a channel, the channel is a channel based on the first time-frequency resource, and the channel is used to transmit downlink data between the first terminal device and the apparatus in the first time period; and an MCS determining unit 1030, configured to determine, according to preset mapping relationship information, a Modulation and Coding scheme MCS corresponding to a value of the quantity K of the terminal devices and a value of the CQI, and use the MCS as an MCS of the first terminal device, where the mapping relationship information is used to indicate a one-to-one mapping relationship between N parameter sets and N MCSs, each parameter set includes a terminal device quantity value and a CQI value, and N≥2.

Optionally, each parameter set further includes a decoding iteration count value;

the receiving unit is further configured to receive second indicator information sent by the first terminal device, where the second indicator information is used to indicate a first decoding iteration count, where the first decoding iteration count is a count of decoding iterations performed when the first terminal device performs decoding processing on the downlink data; and the MCS determining unit is specifically configured to determine, according to the preset mapping relationship information, an MCS corresponding to the value of the quantity K of the terminal devices, the value of the CQI, and the first decoding iteration count value.

Optionally, each parameter set further includes a value of a quantity of acknowledgement messages and a value of a quantity of negative acknowledgement messages;

the quantity determining unit is further configured to determine a quantity of first acknowledgement messages and a quantity of first negative acknowledgement messages, where the first acknowledgement messages are acknowledgement messages sent by the first terminal device to the apparatus in a hybrid automatic repeat request HARQ process for the downlink data, the first negative acknowledgement messages are negative acknowledgement messages sent by the first terminal device to the apparatus in the HARQ process, and the adjustment policy information further includes the quantity of the first acknowledgement messages and the quantity of the first negative acknowledgement messages; and the MCS determining unit is specifically configured to determine, according to the preset mapping relationship information, an MCS corresponding to the value of the quantity K of the terminal devices, the value of the CQI, the quantity of the first acknowledgement messages, and the quantity of the first negative acknowledgement messages.

Optionally, each parameter set further includes a decoding iteration count value, a value of a quantity of acknowledgement messages, and a value of a quantity of negative acknowledgement messages;

the receiving unit is further configured to receive second indicator information sent by the first terminal device, where the second indicator information is used to indicate a first decoding iteration count, where the first decoding iteration count is a count of decoding iterations performed when the first terminal device performs decoding processing on the downlink data;

the quantity determining unit is further configured to determine a quantity of first acknowledgement messages and a quantity of first negative acknowledgement messages, where the first acknowledgement messages are acknowledgement messages sent by the first terminal device to the apparatus in an HARQ process for the downlink data, the first negative acknowledgement messages are negative acknowledgement messages sent by the first terminal device to the apparatus in the HARQ process, and the adjustment policy information further includes the quantity of the first acknowledgement messages and the quantity of the first negative acknowledgement messages; and the MCS determining unit is specifically configured to determine, according to the preset mapping relationship information, an MCS corresponding to the value of the quantity K of the terminal devices, the value of the CQI, the first decoding iteration count value, the quantity of the first acknowledgement messages, and the quantity of the first negative acknowledgement messages.

Optionally, the apparatus is configured in a sparse code multiple access communications system, and the first time-frequency resource is a time-frequency resource block including at least two resource elements REs.

Optionally, the apparatus is a network device.

Optionally, the mapping relationship information is specifically a mapping relationship entry that records the one-to-one mapping relationship between the N parameter sets and the N MCSs.

The apparatus 1000 for determining a Modulation and Coding scheme according to this embodiment of the present disclosure may correspond to a network device (for example, a base station) in a method embodiment of the present disclosure. In addition, each unit, namely, each module, in the apparatus 1000 for determining a Modulation and Coding scheme and the foregoing other operations and/or functions are respectively intended to implement the corresponding procedure of the method 500 in FIG. 5. For brevity, details are not described herein again.

According to the apparatus for determining a Modulation and Coding scheme in this embodiment of the present disclosure, K terminal devices reuse a same time-frequency resource in a same time period to perform data transmission with a network device; data is transmitted between a first terminal device and the network device through a channel based on the time-frequency resource; and an MCS is determined according to the quantity K of the terminal devices and a CQI determined based on a signal to interference plus noise ratio of the channel, so that the MCS can reflect interference noise in the data transmission process of the first terminal device, and that an adjusted Modulation and Coding scheme can adapt to the interference noise of the first terminal device. Therefore, the apparatus is applicable to adjustment of a Modulation and Coding scheme for terminal devices that reuse a same time-frequency resource to perform data transmission.

Figure 11:
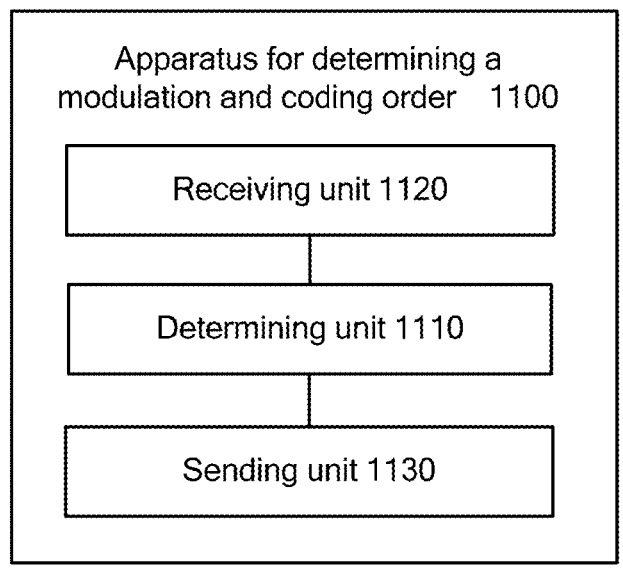
FIG. 11 is a schematic structural diagram of an apparatus for determining a Modulation and Coding scheme according to still another embodiment of the present disclosure.

FIG. 11 is a schematic structural diagram of an apparatus 1100 for determining a Modulation and Coding scheme according to an embodiment of the present disclosure. The apparatus 1100 is a first terminal device in K terminal devices. As shown in FIG. 11, the apparatus 1100 includes:

a determining unit 1110, configured to determine a signal to interference plus noise ratio SINR of a channel, where the channel is a channel based on a first time-frequency resource, the channel is used to transmit downlink data between the apparatus and a network device in a first time period, the K terminal devices reuse the first time-frequency resource in the first time period to receive downlink data from the network device, and K≥2;

a receiving unit 1120, configured to receive first indicator information sent by the network device, where the first indicator information is used to indicate the quantity K of the terminal devices; where the determining unit 1110 is further configured to determine a channel quality indicator CQI according to the signal to interference plus noise ratio SINR of the channel and the quantity K of the terminal devices; and a sending unit 1130, configured to send second indicator information to the network device, where the second indicator information is used to indicate the CQI, so that the network device determines a Modulation and Coding scheme MCS of the apparatus according to the CQI.

Optionally, the determining unit is specifically configured to determine the CQI according to the SINR of the channel, the quantity K of the terminal devices, and a first decoding iteration count, where the first decoding iteration count is a count of decoding iterations performed when the apparatus performs decoding processing on the downlink data.

Optionally, the determining unit is specifically configured to determine the CQI according to the SINR of the channel, the quantity K of the terminal devices, a quantity of first acknowledgement messages, and a quantity of first negative acknowledgement messages, where the first acknowledgement messages are acknowledgement messages sent by the apparatus to the network device in a hybrid automatic repeat request HARQ process for the downlink data, and the first negative acknowledgement messages are negative acknowledgement messages sent by the apparatus to the network device in the HARQ process.

Optionally, the determining unit is specifically configured to determine the CQI according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the apparatus performs decoding processing on the downlink data, the first acknowledgement messages are acknowledgement messages sent by the apparatus to the network device in a hybrid automatic repeat request HARQ process for the downlink data, and the first negative acknowledgement messages are negative acknowledgement messages sent by the apparatus to the network device in the HARQ process.

Optionally, the apparatus is configured in a sparse code multiple access communications system, and the first time-frequency resource is a time-frequency resource block including at least two resource elements REs.

The apparatus 1100 for determining a Modulation and Coding scheme according to this embodiment of the present disclosure may correspond to a first terminal device (for example, a terminal device #1) in a method embodiment of the present disclosure. In addition, each unit, namely, each module, in the apparatus 1100 for determining a Modulation and Coding scheme and the foregoing other operations and/or functions are respectively intended to implement the corresponding procedure of the method 700 in FIG. 7. For brevity, details are not described herein again.

According to the apparatus for determining a Modulation and Coding scheme in this embodiment of the present disclosure, K terminal devices reuse a same time-frequency resource in a same time period to perform data transmission with a network device; data is transmitted between a first terminal device and the network device through a channel based on the time-frequency resource, and a CQI determined based on a signal to interference plus noise ratio of the channel is processed according to the quantity K of the terminal devices and a decoding iteration count, so that a processed CQI can reflect interference noise in the data transmission process of the first terminal device; and a Modulation and Coding scheme of the first terminal device is adjusted according to the processed CQI, so that an adjusted Modulation and Coding scheme can adapt to the interference noise of the first terminal device. Therefore, the apparatus is applicable to adjustment of a Modulation and Coding scheme for terminal devices that reuse a same time-frequency resource to perform data transmission.

Figure 12:
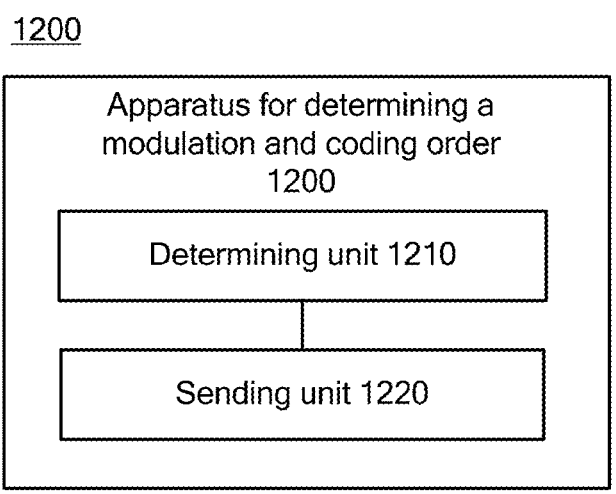
FIG. 12 is a schematic structural diagram of an apparatus for determining a Modulation and Coding scheme according to still another embodiment of the present disclosure.

FIG. 12 is a schematic structural diagram of an apparatus 1200 for determining a Modulation and Coding scheme according to an embodiment of the present disclosure. The apparatus 1200 is a first terminal device in K terminal devices. As shown in FIG. 12, the apparatus 1200 includes:

a determining unit 1210, configured to determine a signal to interference plus noise ratio SINR of a channel, where the channel is a channel based on a first time-frequency resource, the channel is used to transmit downlink data between the apparatus and a network device in a first time period, the K terminal devices reuse the first time-frequency resource in the first time period to receive downlink data from the network device, and K≥2; and configured to determine a channel quality indicator CQI according to the SINR of the channel; and a sending unit 1220, configured to send first indicator information and second indicator information to the network device, where the first indicator information is used to indicate the CQI, and the second indicator information is used to indicate a first decoding iteration count, where the first decoding iteration count is a count of decoding iterations performed when the apparatus performs decoding processing on the downlink data, so that the network device determines a Modulation and Coding scheme MCS of the apparatus according to the quantity K of the terminal devices and the first decoding iteration count.

Optionally, the apparatus is configured in a sparse code multiple access communications system, and the first time-frequency resource is a time-frequency resource block including at least two resource elements REs.

The apparatus 1200 for determining a Modulation and Coding scheme according to this embodiment of the present disclosure may correspond to a first terminal device (for example, a terminal device #1) in a method embodiment of the present disclosure. In addition, each unit, namely, each module, in the apparatus 1200 for determining a Modulation and Coding scheme and the foregoing other operations and/or functions are respectively intended to implement the corresponding procedure of the method 800 in FIG. 8. For brevity, details are not described herein again.

According to the apparatus for determining a Modulation and Coding scheme in this embodiment of the present disclosure, K terminal devices reuse a same time-frequency resource in a same time period to perform data transmission with a network device; data is transmitted between a first terminal device and the network device through a channel based on the time-frequency resource, and a CQI determined based on a signal to interference plus noise ratio of the channel is processed according to the quantity K of the terminal devices and a decoding iteration count, so that a processed CQI can reflect interference noise in the data transmission process of the first terminal device; and a Modulation and Coding scheme of the first terminal device is adjusted according to the processed CQI, so that an adjusted Modulation and Coding scheme can adapt to the interference noise of the first terminal device. Therefore, the apparatus is applicable to adjustment of a Modulation and Coding scheme for terminal devices that reuse a same time-frequency resource to perform data transmission.

The foregoing describes in detail methods for determining a Modulation and Coding scheme according to the embodiments of the present disclosure with reference to FIG. 1 to FIG. 8. The following describes in detail devices for determining a Modulation and Coding scheme according to the embodiments of the present disclosure with reference to FIG. 13 to FIG. 16.

Figure 13:
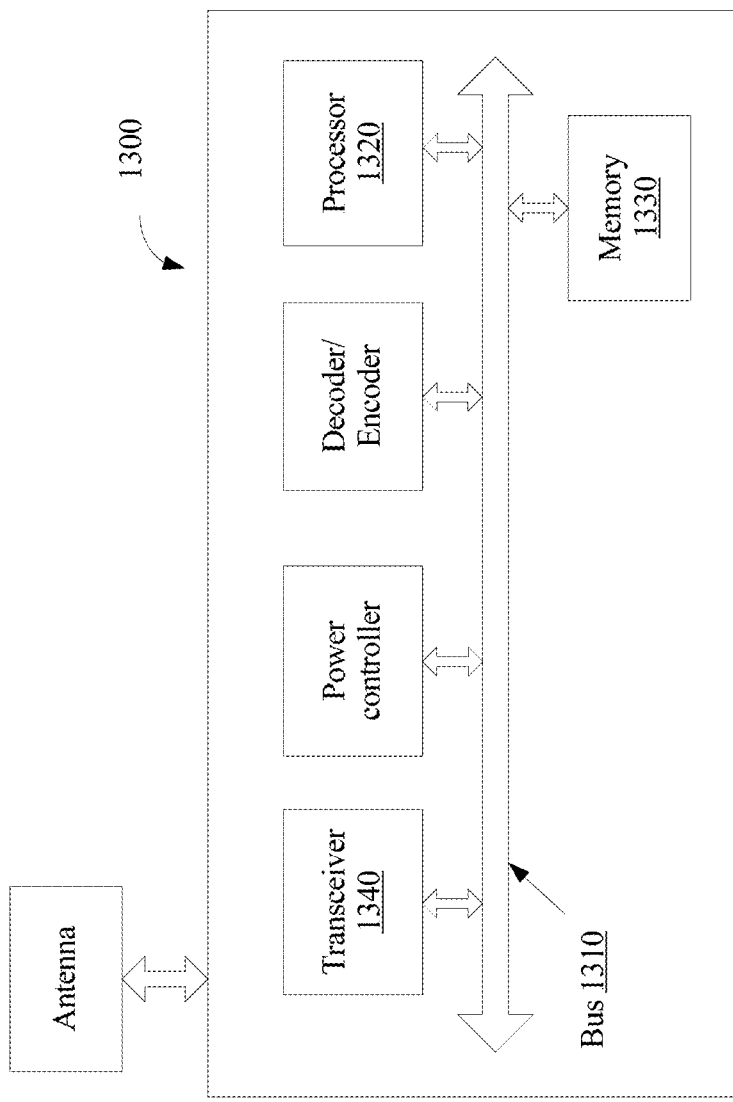
FIG. 13 is a schematic structural diagram of a device for determining a Modulation and Coding scheme according to an embodiment of the present disclosure.

FIG. 13 is a schematic structural diagram of a device 1300 for determining a Modulation and Coding scheme according to an embodiment of the present disclosure. As shown in FIG. 13, the device 1300 includes:

a bus 1310;
a processor 1320 connected to the bus;
a memory 1330 connected to the bus; and
a transceiver 1340 connected to the bus; where the processor invokes, by using the bus, a program stored in the memory, so that the processor is configured to determine a quantity K of terminal devices that reuse a first time-frequency resource in a first time period to perform downlink data transmission with the device, where K≥2;

configured to obtain a channel quality indicator CQI, where the CQI is determined according to a signal to interference plus noise ratio SINR of a channel and the quantity K of the terminal devices, where the channel is a channel based on the first time-frequency resource, and the channel is used to transmit downlink data between a first terminal device and the device in the first time period; and configured to determine a Modulation and Coding scheme MCS of the first terminal device according to the CQI.

Optionally, the CQI is determined according to the SINR of the channel, the quantity K of the terminal devices, and a first decoding iteration count, where the first decoding iteration count is a count of decoding iterations performed when the first terminal device performs decoding processing on the downlink data.

Optionally, the CQI is determined according to the SINR of the channel, the quantity K of the terminal devices, a quantity of first acknowledgement messages, and a quantity of first negative acknowledgement messages, where the first acknowledgement messages are acknowledgement messages sent by the first terminal device to the device in a hybrid automatic repeat request HARQ process for the downlink data, and the first negative acknowledgement messages are negative acknowledgement messages sent by the first terminal device to the device in the HARQ process.

Optionally, the CQI is determined according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the first terminal device performs decoding processing on the downlink data, the first acknowledgement messages are acknowledgement messages sent by the first terminal device to the device in a hybrid automatic repeat request HARQ process for the downlink data, and the first negative acknowledgement messages are negative acknowledgement messages sent by the first terminal device to the device in the HARQ process.

Optionally, the processor is specifically configured to control the transceiver to send first indicator information to the first terminal device, where the first indicator information is used to indicate the quantity K of the terminal devices; and control the transceiver to receive second indicator information sent by the first terminal device, where the second indicator information is used to indicate the CQI, and the CQI is determined by the first terminal device according to the SINR of the channel and the quantity K of the terminal devices.

Optionally, the processor is specifically configured to control the transceiver to send first indicator information to the first terminal device, where the first indicator information is used to indicate the quantity K of the terminal devices; and configured to control the transceiver to receive second indicator information sent by the first terminal device, where the second indicator information is used to indicate the CQI, and the CQI is determined by the first terminal device according to the SINR of the channel, the quantity K of the terminal devices, and a first decoding iteration count, where the first decoding iteration count is a count of decoding iterations performed when the first terminal device performs decoding processing on the downlink data.

Optionally, the processor is specifically configured to control the transceiver to send first indicator information to the first terminal device, where the first indicator information is used to indicate the quantity K of the terminal devices; and control the transceiver to receive second indicator information sent by the first terminal device, where the second indicator information is used to indicate the CQI, and the CQI is determined by the first terminal device according to the SINR of the channel, the quantity K of the terminal devices, a quantity of first acknowledgement messages, and a quantity of first negative acknowledgement messages, where the first acknowledgement messages are acknowledgement messages sent by the first terminal device to the device in a hybrid automatic repeat request HARQ process for the downlink data, and the first negative acknowledgement messages are negative acknowledgement messages sent by the first terminal device to the device in the HARQ process.

Optionally, the processor is specifically configured to control the transceiver to send first indicator information to the first terminal device, where the first indicator information is used to indicate the quantity K of the terminal devices; and control the transceiver to receive second indicator information sent by the first terminal device, where the second indicator information is used to indicate the CQI, and the CQI is determined by the first terminal device according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the first terminal device performs decoding processing on the downlink data, the first acknowledgement messages are acknowledgement messages sent by the first terminal device to the device in a hybrid automatic repeat request HARQ process for the downlink data, and the first negative acknowledgement messages are negative acknowledgement messages sent by the first terminal device to the device in the HARQ process.

Optionally, the processor is specifically configured to control the transceiver to receive third indicator information sent by the first terminal device, where the third indicator information is used to indicate a CQI fed back by the first terminal device, and the CQI fed back by the first terminal device is determined by the first terminal device according to the SINR of the channel; and configured to process, according to the quantity K of the terminal devices, the CQI fed back by the first terminal device, so as to determine the CQI.

Optionally, the processor is specifically configured to control the transceiver to receive fourth indicator information sent by the first terminal device, where the fourth indicator information is used to indicate a first decoding iteration count, where the first decoding iteration count is a count of decoding iterations performed when the first terminal device performs decoding processing on the downlink data; and configured to process, according to the quantity K of the terminal devices and the first decoding iteration count, the CQI fed back by the first terminal device.

Optionally, the processor is specifically configured to determine a quantity of first acknowledgement messages and a quantity of first negative acknowledgement messages, where the first acknowledgement messages are acknowledgement messages sent by the first terminal device to the device in an HARQ process for the downlink data, and the first negative acknowledgement messages are negative acknowledgement messages sent by the first terminal device to the device in the HARQ process; and configured to process, according to the quantity K of the terminal devices, the quantity of the first acknowledgement messages, and the quantity of the first negative acknowledgement messages, the CQI fed back by the first terminal device.

Optionally, the processor is specifically configured to control the transceiver to receive fourth indicator information sent by the first terminal device, where the fourth indicator information is used to indicate a first decoding iteration count, where the first decoding iteration count is a count of decoding iterations performed when the first terminal device performs decoding processing on the downlink data;

configured to determine a quantity of first acknowledgement messages and a quantity of first negative acknowledgement messages, where the first acknowledgement messages are acknowledgement messages sent by the first terminal device to the device in an HARQ process for the downlink data, and the first negative acknowledgement messages are negative acknowledgement messages sent by the first terminal device to the device in the HARQ process; and configured to process, according to the quantity K of the terminal devices, the first decoding iteration count, the quantity of the first acknowledgement messages, and the quantity of the first negative acknowledgement messages, the CQI fed back by the first terminal device.

Optionally, the device is configured in a sparse code multiple access communications system, and the first time-frequency resource is a time-frequency resource block including at least two resource elements REs.

Optionally, the device is a network device.

This embodiment of the present disclosure is applicable to various communications devices.

A receiver of the device 1300 may include a receiver circuit, a power controller, a decoder, and an antenna. In addition, the device 1300 may further include a transmitter. The transmitter may include a transmitter circuit, a power controller, an encoder, and an antenna.

The processor may be further referred to as a CPU. The memory may include a read-only memory and a random access memory, and provide an instruction and data to the processor. A part of the memory may further include a non-volatile random access memory (NVRAM). In a specific application, the device 1300 may be built in or the device 1300 itself may be a network device such as a base station, and may further include a carrier accommodating a transmitter circuit and a receiver circuit, so as to allow data transmission and reception between the device 1300 and a remote device. The transmitter circuit and the receiver circuit may be coupled to the antenna. Components in the device 1300 are coupled together by using the bus. The bus further includes a power bus, a control bus, and a status signal bus, in addition to a data bus. However, for clear description, various buses are denoted as the bus in the figure. Specifically, in different products, a decoder may be integrated with a processor.

The processor may implement or execute steps and logical block diagrams disclosed in the method embodiments of the present disclosure. A general purpose processor may be a microprocessor, or the processor may be any conventional processor, decoder, or the like. Steps of the methods disclosed with reference to the embodiments of the present disclosure may be directly executed and completed by means of a hardware processor, or may be executed and completed by using a combination of hardware and software modules in the decoding processor. The software modules may be located in a mature storage medium in the art, such as a random access memory, a flash memory, a read-only memory, a programmable read-only memory, an electrically-erasable programmable memory, or a register.

It should be understood that, in the embodiments of the present disclosure, the processor may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory. For example, the memory may further store information about a device type.

The bus system may further include a power bus, a control bus, a status signal bus, and the like, in addition to a data bus. However, for clear description, various buses in the figure are denoted as the bus system.

In an implementation process, each step of the foregoing methods may be completed by using an integrated logic circuit of hardware in the processor or an instruction in a form of software. Steps of the methods disclosed with reference to the embodiments of the present disclosure may be directly executed and completed by a hardware processor, or may be executed and completed by using a combination of hardware and software modules in the processor. The software modules may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. For avoiding repetition, details are not described herein again.

The device 1300 for determining a Modulation and Coding scheme according to this embodiment of the present disclosure may correspond to a network device (for example, a base station) in a method embodiment of the present disclosure. In addition, each unit, namely, each module, in the device 1300 for determining a Modulation and Coding scheme and the foregoing other operations and/or functions are respectively intended to implement the corresponding procedure of the method 200 in FIG. 2. For brevity, details are not described herein again.

According to the device for determining a Modulation and Coding scheme in this embodiment of the present disclosure, K terminal devices reuse a same time-frequency resource in a same time period to perform data transmission with a network device; data is transmitted between a first terminal device and the network device through a channel based on the time-frequency resource, and a CQI determined based on a signal to interference plus noise ratio of the channel is processed according to the quantity K of the terminal devices and a decoding iteration count, so that a processed CQI can reflect interference noise in the data transmission process of the first terminal device; and a Modulation and Coding scheme of the first terminal device is adjusted according to the processed CQI, so that an adjusted Modulation and Coding scheme can adapt to the interference noise of the first terminal device. Therefore, the device is applicable to adjustment of a Modulation and Coding scheme for terminal devices that reuse a same time-frequency resource to perform data transmission.

Figure 14:
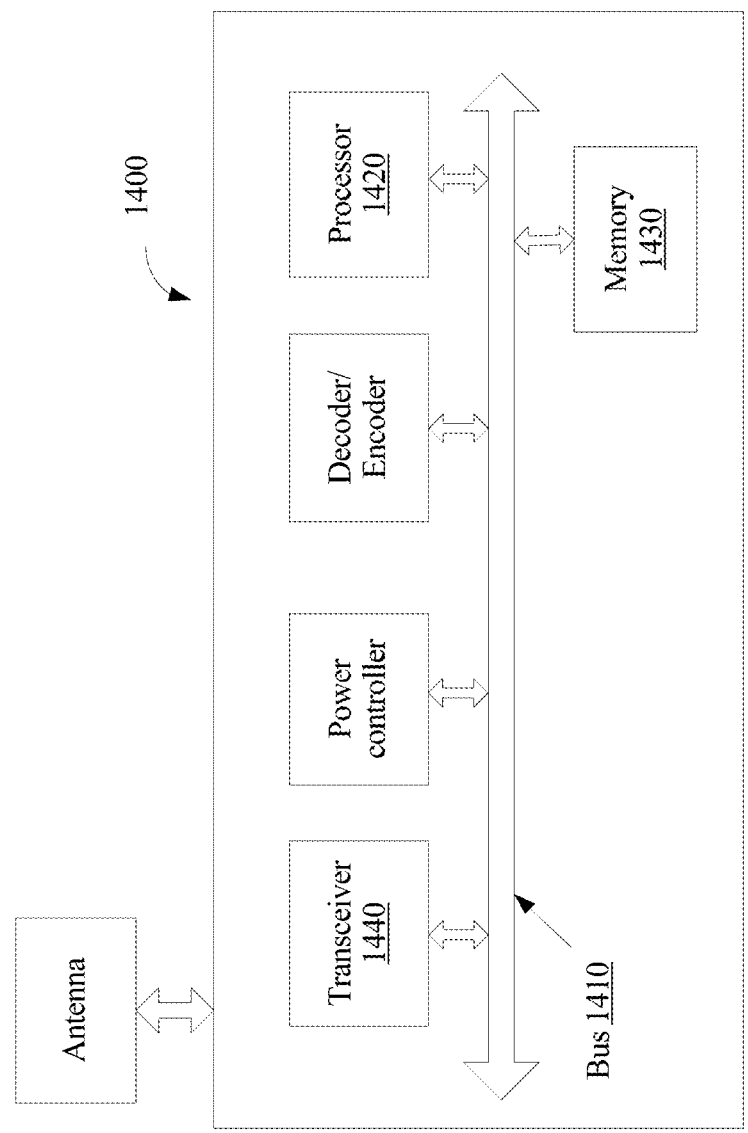
FIG. 14 is a schematic structural diagram of a device for determining a Modulation and Coding scheme according to another embodiment of the present disclosure.

FIG. 14 is a schematic structural diagram of a device 1400 for determining a Modulation and Coding scheme according to an embodiment of the present disclosure. As shown in FIG. 14, the device 1400 includes:

a bus 1410;

a processor 1420 connected to the bus;

a memory 1430 connected to the bus; and a transceiver 1440 connected to the bus; where the processor invokes, by using the bus, a program stored in the memory, so that the processor is configured to determine a quantity K of terminal devices that reuse a first time-frequency resource in a first time period to perform downlink data transmission with the device, where K≥2;

configured to control the transceiver to receive first indicator information sent by the first terminal device, where the first indicator information is used to indicate a channel quality indicator CQI, the CQI is determined by the first terminal device according to an SINR of a channel, the channel is a channel based on the first time-frequency resource, and the channel is used to transmit downlink data between the first terminal device and the device in the first time period; and configured to determine, according to preset mapping relationship information, a Modulation and Coding scheme MCS corresponding to a value of the quantity K of the terminal devices and a value of the CQI, and use the MCS as an MCS of the first terminal device, where the mapping relationship information is used to indicate a one-to-one mapping relationship between N parameter sets and N MCSs, each parameter set includes a terminal device quantity value and a CQI value, and N≥2.

Optionally, each parameter set further includes a decoding iteration count value; and the processor is further configured to control the transceiver to receive second indicator information sent by the first terminal device, where the second indicator information is used to indicate a first decoding iteration count, where the first decoding iteration count is a count of decoding iterations performed when the first terminal device performs decoding processing on the downlink data; and configured to determine, according to the preset mapping relationship information, an MCS corresponding to the value of the quantity K of the terminal devices, the value of the CQI, and the first decoding iteration count value.

Optionally, each parameter set further includes a value of a quantity of acknowledgement messages and a value of a quantity of negative acknowledgement messages; and the processor is further configured to determine a quantity of first acknowledgement messages and a quantity of first negative acknowledgement messages, where the first acknowledgement messages are acknowledgement messages sent by the first terminal device to the device in a hybrid automatic repeat request HARQ process for the downlink data, the first negative acknowledgement messages are negative acknowledgement messages sent by the first terminal device to the device in the HARQ process, and the adjustment policy information further includes the quantity of the first acknowledgement messages and the quantity of the first negative acknowledgement messages; and configured to determine, according to the preset mapping relationship information, an MCS corresponding to the value of the quantity K of the terminal devices, the value of the CQI, the quantity of the first acknowledgement messages, and the quantity of the first negative acknowledgement messages.

Optionally, each parameter set further includes a decoding iteration count value, a value of a quantity of acknowledgement messages, and a value of a quantity of negative acknowledgement messages; and the processor is further configured to control the transceiver to receive second indicator information sent by the first terminal device, where the second indicator information is used to indicate a first decoding iteration count, where the first decoding iteration count is a count of decoding iterations performed when the first terminal device performs decoding processing on the downlink data;

configured to determine a quantity of first acknowledgement messages and a quantity of first negative acknowledgement messages, where the first acknowledgement messages are acknowledgement messages sent by the first terminal device to the device in an HARQ process for the downlink data, the first negative acknowledgement messages are negative acknowledgement messages sent by the first terminal device to the device in the HARQ process, and the adjustment policy information further includes the quantity of the first acknowledgement messages and the quantity of the first negative acknowledgement messages; and configured to determine, according to the preset mapping relationship information, an MCS corresponding to the value of the quantity K of the terminal devices, the value of the CQI, the first decoding iteration count value, the quantity of the first acknowledgement messages, and the quantity of the first negative acknowledgement messages.

Optionally, the device is configured in a sparse code multiple access communications system, and the first time-frequency resource is a time-frequency resource block including at least two resource elements REs.

Optionally, the device is a network device.

Optionally, the mapping relationship information is specifically a mapping relationship entry that records the one-to-one mapping relationship between the N parameter sets and the N MCSs.

This embodiment of the present disclosure is applicable to various communications devices.

A receiver of the device 1400 may include a receiver circuit, a power controller, a decoder, and an antenna. In addition, the device 1400 may further include a transmitter. The transmitter may include a transmitter circuit, a power controller, an encoder, and an antenna.

The processor may be further referred to as a CPU. The memory may include a read-only memory and a random access memory, and provide an instruction and data to the processor. A part of the memory may further include a non-volatile random access memory (NVRAM). In a specific application, the device 1400 may be built in or the device 1400 itself may be a network device such as a base station, and may further include a carrier accommodating a transmitter circuit and a receiver circuit, so as to allow data transmission and reception between the device 1400 and a remote location. The transmitter circuit and the receiver circuit may be coupled to the antenna. Components in the device 1400 are coupled together by using the bus, where the bus further includes a power bus, a control bus, and a status signal bus, in addition to a data bus. However, for clear description, various buses are denoted as the bus in the figure. Specifically, in different products, a decoder may be integrated with a processing unit.

The processor may implement or execute steps and logical block diagrams disclosed in the method embodiments of the present disclosure. A general purpose processor may be a microprocessor, or the processor may be any conventional processor, decoder, or the like. Steps of the methods disclosed with reference to the embodiments of the present disclosure may be directly executed and completed by means of a hardware processor, or may be executed and completed by using a combination of hardware and software modules in the decoding processor. The software modules may be located in a mature storage medium in the art, such as a random access memory, a flash memory, a read-only memory, a programmable read-only memory, an electrically-erasable programmable memory, or a register.

It should be understood that, in the embodiments of the present disclosure, the processor may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory. For example, the memory may further store information about a device type.

The bus system may further include a power bus, a control bus, a status signal bus, and the like, in addition to a data bus. However, for clear description, various buses in the figure are denoted as the bus system.

In an implementation process, each step of the foregoing methods may be completed by using an integrated logic circuit of hardware in the processor or an instruction in a form of software. Steps of the methods disclosed with reference to the embodiments of the present disclosure may be directly executed and completed by a hardware processor, or may be executed and completed by using a combination of hardware and software modules in the processor. The software modules may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. For avoiding repetition, details are not described herein again.

The device 1400 for determining a Modulation and Coding scheme according to this embodiment of the present disclosure may correspond to a network device (for example, a base station) in a method embodiment of the present disclosure. In addition, each unit, namely, each module, in the device 1400 for determining a Modulation and Coding scheme and the foregoing other operations and/or functions are respectively intended to implement the corresponding procedure of the method 500 in FIG. 5. For brevity, details are not described herein again.

According to the device for determining a Modulation and Coding scheme in this embodiment of the present disclosure, K terminal devices reuse a same time-frequency resource in a same time period to perform data transmission with a network device; data is transmitted between a first terminal device and the network device through a channel based on the time-frequency resource; and an MCS is determined according to the quantity K of the terminal devices and a CQI determined based on a signal to interference plus noise ratio of the channel, so that the MCS can reflect interference noise in the data transmission process of the first terminal device, and that an adjusted Modulation and Coding scheme can adapt to the interference noise of the first terminal device. Therefore, the device is applicable to adjustment of a Modulation and Coding scheme for terminal devices that reuse a same time-frequency resource to perform data transmission.

Figure 15:
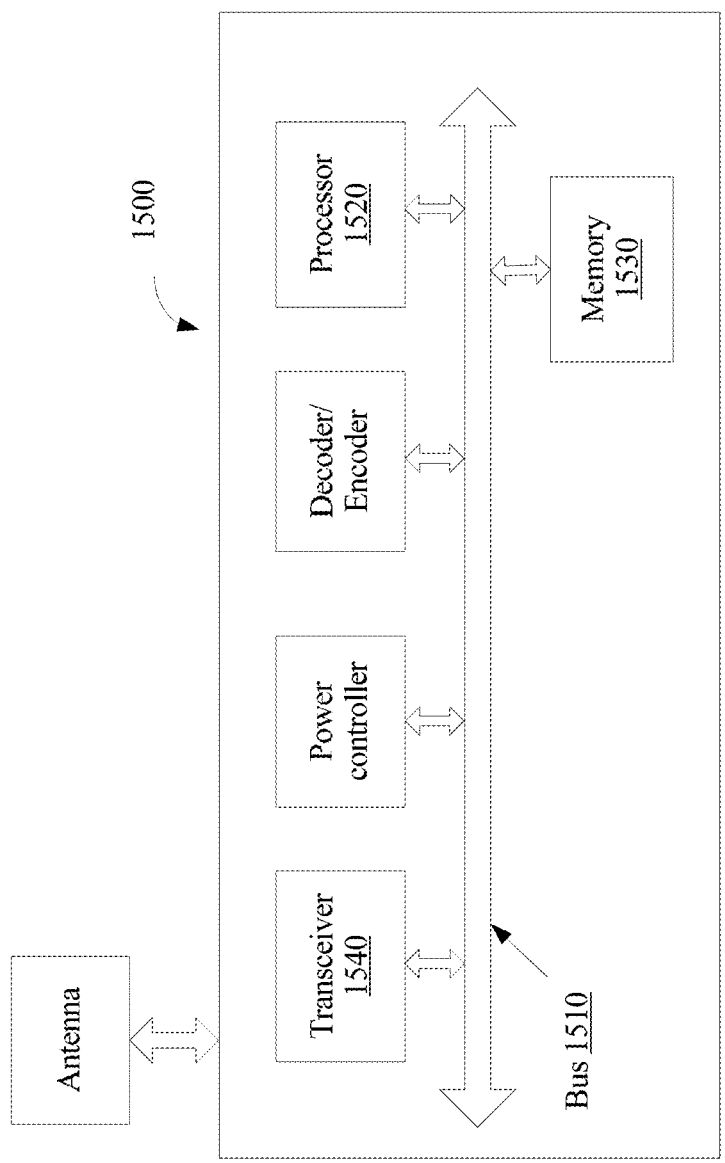
FIG. 15 is a schematic structural diagram of a device for determining a Modulation and Coding scheme according to still another embodiment of the present disclosure.

FIG. 15 is a schematic structural diagram of a device 1500 for determining a Modulation and Coding scheme according to an embodiment of the present disclosure. The device 1500 is a first terminal device in K terminal devices. As shown in FIG. 15, the device 1500 includes:

a bus 1510;
a processor 1520 connected to the bus;
a memory 1530 connected to the bus; and
a transceiver 1540 connected to the bus; where
the processor invokes, by using the bus, a program stored in the memory, so that the processor is configured to determine a signal to interference plus noise ratio SINR of a channel, where the channel is a channel based on a first time-frequency resource, the channel is used to transmit downlink data between the device and a network device in a first time period, the K terminal devices reuse the first time-frequency resource in the first time period to receive downlink data from the network device, and K≥2;

configured to control the transceiver to receive first indicator information sent by the network device, where the first indicator information is used to indicate the quantity K of the terminal devices;

configured to determine a channel quality indicator CQI according to the signal to interference plus noise ratio SINR of the channel and the quantity K of the terminal devices; and configured to control the transceiver to send second indicator information to the network device, where the second indicator information is used to indicate the CQI, so that the network device determines a Modulation and Coding scheme MCS of the device according to the CQI.

Optionally, the processor is specifically configured to determine the CQI according to the SINR of the channel, the quantity K of the terminal devices, and a first decoding iteration count, where the first decoding iteration count is a count of decoding iterations performed when the device performs decoding processing on the downlink data.

Optionally, the processor is specifically configured to determine the CQI according to the SINR of the channel, the quantity K of the terminal devices, a quantity of first acknowledgement messages, and a quantity of first negative acknowledgement messages, where the first acknowledgement messages are acknowledgement messages sent by the device to the network device in a hybrid automatic repeat request HARQ process for the downlink data, and the first negative acknowledgement messages are negative acknowledgement messages sent by the device to the network device in the HARQ process.

Optionally, the processor is specifically configured to determine the CQI according to the SINR of the channel, the quantity K of the terminal devices, a first decoding iteration count, a quantity of first acknowledgement messages, and a quantity of first negative acknowledgement messages, where the first decoding iteration count is a count of decoding iterations performed when the device performs decoding processing on the downlink data, the first acknowledgement messages are acknowledgement messages sent by the device to the network device in a hybrid automatic repeat request HARQ process for the downlink data, and the first negative acknowledgement messages are negative acknowledgement messages sent by the device to the network device in the HARQ process.

Optionally, the device belongs to a sparse code multiple access communications system, and the first time-frequency resource is a time-frequency resource block including at least two resource elements REs.

This embodiment of the present disclosure is applicable to various communications devices.

A receiver of the device 1500 may include a receiver circuit, a power controller, a decoder, and an antenna. In addition, the device 1500 may further include a transmitter. The transmitter may include a transmitter circuit, a power controller, an encoder, and an antenna.

The processor may be further referred to as a CPU. The memory may include a read-only memory and a random access memory, and provide an instruction and data to the processor. A part of the memory may further include a non-volatile random access memory (NVRAM). In a specific application, the device 1500 may be built in or the device 1500 itself may be a wireless communications device such as a mobile phone, and may further include a carrier accommodating a transmitter circuit and a receiver circuit, so as to allow data transmission and reception between the device 1500 and a remote location. The transmitter circuit and the receiver circuit may be coupled to the antenna. Components in the device 1500 are coupled together by using the bus, where the bus further includes a power bus, a control bus, and a status signal bus, in addition to a data bus. However, for clear description, various buses are denoted as the bus in the figure. Specifically, in different products, a decoder may be integrated with a processing unit.

The processor may implement or execute steps and logical block diagrams disclosed in the method embodiments of the present disclosure. A general purpose processor may be a microprocessor, or the processor may be any conventional processor, decoder, or the like. Steps of the methods disclosed with reference to the embodiments of the present disclosure may be directly executed and completed by means of a hardware processor, or may be executed and completed by using a combination of hardware and software modules in the decoding processor. The software modules may be located in a mature storage medium in the art, such as a random access memory, a flash memory, a read-only memory, a programmable read-only memory, an electrically-erasable programmable memory, or a register.

It should be understood that, in the embodiments of the present disclosure, the processor may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory. For example, the memory may further store information about a device type.

The bus system may further include a power bus, a control bus, a status signal bus, and the like, in addition to a data bus. However, for clear description, various buses in the figure are denoted as the bus system.

In an implementation process, each step of the foregoing methods may be completed by using an integrated logic circuit of hardware in the processor or an instruction in a form of software. Steps of the methods disclosed with reference to the embodiments of the present disclosure may be directly executed and completed by a hardware processor, or may be executed and completed by using a combination of hardware and software modules in the processor. The software modules may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. For avoiding repetition, details are not described herein again.

The device 1500 for determining a Modulation and Coding scheme according to this embodiment of the present disclosure may correspond to a first terminal device (for example, a terminal device #1) in a method embodiment of the present disclosure. In addition, each unit, namely, each module, in the device 1500 for determining a Modulation and Coding scheme and the foregoing other operations and/or functions are respectively intended to implement the corresponding procedure of the method 700 in FIG. 7. For brevity, details are not described herein again.

According to the device for determining a Modulation and Coding scheme in this embodiment of the present disclosure, K terminal devices reuse a same time-frequency resource in a same time period to perform data transmission with a network device; data is transmitted between a first terminal device and the network device through a channel based on the time-frequency resource, and a CQI determined based on a signal to interference plus noise ratio of the channel is processed according to the quantity K of the terminal devices and a decoding iteration count, so that a processed CQI can reflect interference noise in the data transmission process of the first terminal device; and a Modulation and Coding scheme of the first terminal device is adjusted according to the processed CQI, so that an adjusted Modulation and Coding scheme can adapt to the interference noise of the first terminal device. Therefore, the device is applicable to adjustment of a Modulation and Coding scheme for terminal devices that reuse a same time-frequency resource to perform data transmission.

Figure 16:
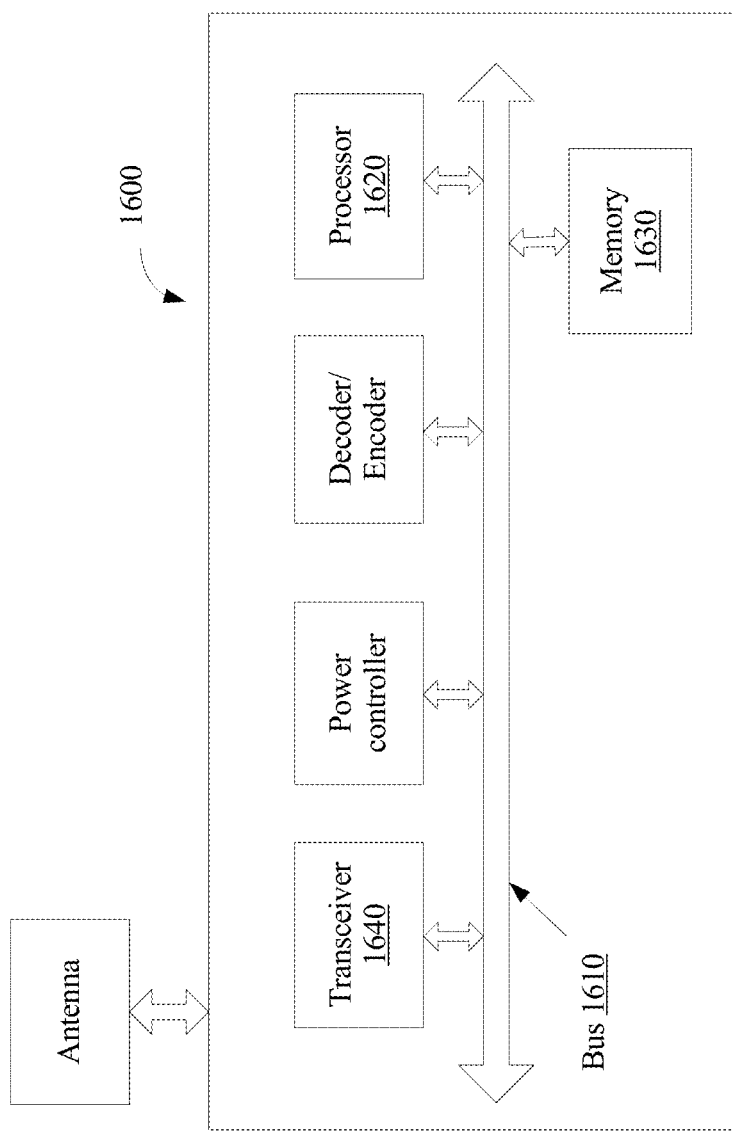
FIG. 16 is a schematic structural diagram of a device for determining a Modulation and Coding scheme according to still another embodiment of the present disclosure.

FIG. 16 is a schematic structural diagram of a device 1600 for determining a Modulation and Coding scheme according to an embodiment of the present disclosure. The device 1600 is a first terminal device in K terminal devices. As shown in FIG. 16, the device 1600 includes:

a bus 1610;

a processor 1620 connected to the bus;

a memory 1630 connected to the bus; and a transceiver 1640 connected to the bus; where the processor invokes, by using the bus, a program stored in the memory, so that the processor is configured to determine a signal to interference plus noise ratio SINR of a channel, where the channel is a channel based on a first time-frequency resource, the channel is used to transmit downlink data between the device and a network device in a first time period, the K terminal devices reuse the first time-frequency resource in the first time period to receive downlink data from the network device, and K≥2;

configured to determine a channel quality indicator CQI according to the SINR of the channel; and configured to control the transceiver to send first indicator information and second indicator information to the network device, where the first indicator information is used to indicate the CQI, and the second indicator information is used to indicate a first decoding iteration count, where the first decoding iteration count is a count of decoding iterations performed when the device performs decoding processing on the downlink data, so that the network device determines a Modulation and Coding scheme MCS of the device according to the quantity K of the terminal devices and the first decoding iteration count.

Optionally, the device belongs to a sparse code multiple access communications system, and the first time-frequency resource is a time-frequency resource block including at least two resource elements REs.

This embodiment of the present disclosure is applicable to various communications devices.

A receiver of the device 1600 may include a receiver circuit, a power controller, a decoder, and an antenna. In addition, the device 1600 may further include a transmitter.

The transmitter may include a transmitter circuit, a power controller, an encoder, and an antenna.

The processor may be further referred to as a CPU. The memory may include a read-only memory and a random access memory, and provide an instruction and data to the processor. A part of the memory may further include a non-volatile random access memory (NVRAM). In a specific application, the device 1600 may be built in or the device 1600 itself may be a wireless communications device such as a mobile phone, and may further include a carrier accommodating a transmitter circuit and a receiver circuit, so as to allow data transmission and reception between the device 1600 and a remote location. The transmitter circuit and the receiver circuit may be coupled to the antenna. Components in the device 1600 are coupled together by using the bus, where the bus further includes a power bus, a control bus, and a status signal bus, in addition to a data bus. However, for clear description, various buses are denoted as the bus in the figure. Specifically, in different products, a decoder may be integrated with a processing unit.

The processor may implement or execute steps and logical block diagrams disclosed in the method embodiments of the present disclosure. A general purpose processor may be a microprocessor, or the processor may be any conventional processor, decoder, or the like. Steps of the methods disclosed with reference to the embodiments of the present disclosure may be directly executed and completed by means of a hardware processor, or may be executed and completed by using a combination of hardware and software modules in the decoding processor. The software modules may be located in a mature storage medium in the art, such as a random access memory, a flash memory, a read-only memory, a programmable read-only memory, an electrically-erasable programmable memory, or a register.

It should be understood that, in the embodiments of the present disclosure, the processor may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory. For example, the memory may further store information about a device type.

The bus system may further include a power bus, a control bus, a status signal bus, and the like, in addition to a data bus. However, for clear description, various buses in the figure are denoted as the bus system.

In an implementation process, each step of the foregoing methods may be completed by using an integrated logic circuit of hardware in the processor or an instruction in a form of software. Steps of the methods disclosed with reference to the embodiments of the present disclosure may be directly executed and completed by a hardware processor, or may be executed and completed by using a combination of hardware and software modules in the processor. The software modules may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. For avoiding repetition, details are not described herein again.

The device 1600 for determining a Modulation and Coding scheme according to this embodiment of the present disclosure may correspond to a first terminal device (for example, a terminal device #1) in a method embodiment of the present disclosure. In addition, each unit, namely, each module, in the device 1600 for determining a Modulation and Coding scheme and the foregoing other operations and/or functions are respectively intended to implement the corresponding procedure of the method 800 in FIG. 8. For brevity, details are not described herein again.

According to the device for determining a Modulation and Coding scheme in this embodiment of the present disclosure, K terminal devices reuse a same time-frequency resource in a same time period to perform data transmission with a network device; data is transmitted between a first terminal device and the network device through a channel based on the time-frequency resource, and a CQI determined based on a signal to interference plus noise ratio of the channel is processed according to the quantity K of the terminal devices and a decoding iteration count, so that a processed CQI can reflect interference noise in the data transmission process of the first terminal device; and a Modulation and Coding scheme of the first terminal device is adjusted according to the processed CQI, so that an adjusted Modulation and Coding scheme can adapt to the interference noise of the first terminal device. Therefore, the device is applicable to adjustment of a Modulation and Coding scheme for terminal devices that reuse a same time-frequency resource to perform data transmission.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for determining a modulation and coding order, the method comprising:
   determining, by a network device, a quantity K of terminal devices that reuse a first time-frequency resource in a first time period to receive downlink data from the network device, wherein K≥2;
   determining, by the network device, a signal to interference plus noise ratio (SINR) of a channel, wherein the channel is a channel based on the first time-frequency resource, and the channel is used to transmit the downlink data between the network device and a first terminal device in the first time period;
   determining, by the network device, a quantity of first acknowledgement messages and a quantity of first negative acknowledgement messages, wherein the first acknowledgement messages are acknowledgement messages sent by the first terminal device to the network device in a HARQ process for the downlink data, and the first negative acknowledgement messages are negative acknowledgement messages sent by the first terminal device to the network device in the HARQ process;
   determining, by the network device, a channel quality indicator (CQI), wherein the CQI is determined according to the SINR of the channel, the quantity K of the terminal devices, the quantity of the first acknowledgement messages, and the quantity of the first negative acknowledgement messages; and
   determining, by the network device, a Modulation and Coding scheme (MCS) of the first terminal device according to the CQI.

2. The method according to claim 1, wherein the CQI is further determined according to a first decoding iteration count, wherein the first decoding iteration count is a count of decoding iterations performed when the first terminal device performs decoding processing on the downlink data.

3. The method according to claim 1, wherein the CQI is further determined according to a first decoding iteration count, wherein the first decoding iteration count is a count of decoding iterations performed when the first terminal device performs decoding processing on the downlink data.

4. The method according to claim 1, wherein the determining the CQI comprises:
   sending first indicator information to the first terminal device, wherein the first indicator information indicates the quantity K of the terminal devices; and
   receiving second indicator information sent by the first terminal device, wherein the second indicator information indicates the CQI, and the CQI is determined by the first terminal device according to the SINR of the channel and the quantity K of the terminal devices.

5. The method according to claim 1, wherein the determining the CQI comprises:
   sending first indicator information to the first terminal device, wherein the first indicator information indicates the quantity K of the terminal devices; and
   receiving second indicator information sent by the first terminal device, wherein the second indicator information indicates the CQI, and the CQI is determined by the first terminal device according to the SINR of the channel, the quantity K of the terminal devices, and a first decoding iteration count, wherein the first decoding iteration count is a count of decoding iterations performed when the first terminal device performs decoding processing on the downlink data.

6. The method according to claim 1, wherein the determining the CQI comprises:
   sending first indicator information to the first terminal device, wherein the first indicator information indicates the quantity K of the terminal devices; and
   receiving second indicator information sent by the first terminal device, wherein the second indicator information indicates the CQI, and the CQI is determined by the first terminal device according to the SINR of the channel, the quantity K of the terminal devices, the quantity of first acknowledgement messages, and the quantity of first negative acknowledgement messages.

7. The method according to claim 1, wherein the determining the CQI comprises:
   sending first indicator information to the first terminal device, wherein the first indicator information indicates the quantity K of the terminal devices; and
   receiving second indicator information sent by the first terminal device, wherein the second indicator information indicates the CQI, and the CQI is determined by the first terminal device according to the SINR of the channel, the quantity K of the terminal devices, a first decoding iteration count, the quantity of first acknowledgement messages, and the quantity of first negative acknowledgement messages, wherein the first decoding iteration count is a count of decoding iterations performed when the first terminal device performs decoding processing on the downlink data.

8. The method according to claim 1, wherein the determining the CQI comprises:
receiving third indicator information sent by the first terminal device, wherein the third indicator information indicates a CQI fed back by the first terminal device, and the CQI fed back by the first terminal device is determined by the first terminal device according to the SINR of the channel; and
processing, according to the quantity K of the terminal devices, the CQI fed back by the first terminal device, so as to determine the CQI.

9. The method according to claim 8, wherein the method further comprises:
receiving fourth indicator information sent by the first terminal device, wherein the fourth indicator information indicates a first decoding iteration count, wherein the first decoding iteration count is a count of decoding iterations performed when the first terminal device performs decoding processing on the downlink data; and
the processing, according to the quantity K of the terminal devices, the CQI fed back by the first terminal device comprises:
processing, according to the quantity K of the terminal devices and the first decoding iteration count, the CQI fed back by the first terminal device.

10. The method according to claim 1, wherein the method is applied to a sparse code multiple access communications system, and the first time-frequency resource is a time-frequency resource block comprising at least two resource elements.

11. A device for determining a modulation and coding order, the device comprising:
a bus;
a processor connected to the bus;
a memory connected to the bus, wherein the memory stores a program; and
a transceiver connected to the bus;
wherein the processor invokes, by using the bus, the program stored in the memory, to cause the device to:
determine a quantity K of terminal devices that reuse a first time-frequency resource in a first time period to perform downlink data transmission with the device, wherein K≥2;
determine a signal to interference plus noise ratio (SINR) of a channel, wherein the channel is a channel based on the first time-frequency resource, and the channel is used to transmit downlink data between the device and a first terminal device in the first time period;
determine a quantity of first acknowledgement messages and a quantity of first negative acknowledgement messages, wherein the first acknowledgement messages are acknowledgement messages sent by the first terminal device to the network device in a HARQ process for the downlink data, and the first negative acknowledgement messages are negative acknowledgement messages sent by the first terminal device to the network device in the HARQ process;
determine a channel quality indicator (CQI), wherein the CQI is determined according to the SINR of the channel, the quantity K of the terminal devices, the quantity of the first acknowledgement messages, and the quantity of the first negative acknowledgement messages; and
determine a Modulation and Coding scheme (MCS) of the first terminal device according to the CQI.

12. The device according to claim 11, wherein the CQI is further determined according to a first decoding iteration count, wherein the first decoding iteration count is a count of decoding iterations performed when the first terminal device performs decoding processing on the downlink data.

13. The device according to claim 11, wherein the CQI is further determined according to a first decoding iteration count, wherein the first decoding iteration count is a count of decoding iterations performed when the first terminal device performs decoding processing on the downlink data.

14. The device according to claim 11, wherein the processor is configured to:
control the transceiver to send first indicator information to the first terminal device, wherein the first indicator information indicates the quantity K of the terminal devices; and
control the transceiver to receive second indicator information sent by the first terminal device, wherein the second indicator information indicates the CQI, and the CQI is determined by the first terminal device according to the SINR of the channel and the quantity K of the terminal devices.

15. The device according to claim 11, wherein the processor is configured to:
control the transceiver to send first indicator information to the first terminal device, wherein the first indicator information indicates the quantity K of the terminal devices; and
control the transceiver to receive second indicator information sent by the first terminal device, wherein the second indicator information indicates the CQI, and the CQI is determined by the first terminal device according to the SINR of the channel, the quantity K of the terminal devices, and a first decoding iteration count, wherein the first decoding iteration count is a count of decoding iterations performed when the first terminal device performs decoding processing on the downlink data.

16. The device according to claim 11, wherein the processor is configured to:
control the transceiver to send first indicator information to the first terminal device, wherein the first indicator information indicates the quantity K of the terminal devices; and
control the transceiver to receive second indicator information sent by the first terminal device, wherein the second indicator information indicates the CQI, and the CQI is determined by the first terminal device according to the SINR of the channel, the quantity K of the terminal devices, a quantity of first acknowledgement messages, and a quantity of first negative acknowledgement messages, wherein the first acknowledgement messages are acknowledgement messages sent by the first terminal device to the device in a hybrid automatic repeat request (HARQ) process for the downlink data, and the first negative acknowledgement messages are negative acknowledgement messages sent by the first terminal device to the device in the HARQ process.

17. The device according to claim 11, wherein the processor is configured to:

control the transceiver to send first indicator information to the first terminal device, wherein the first indicator information indicates the quantity K of the terminal devices; and control the transceiver to receive second indicator information sent by the first terminal device, wherein the second indicator information indicates the CQI, and the CQI is determined by the first terminal device according to the SINR of the channel, the quantity K of the terminal devices, a first decoding iteration count, the quantity of first acknowledgement messages, and the quantity of first negative acknowledgement messages, wherein the first decoding iteration count is a count of decoding iterations performed when the first terminal device performs decoding processing on the downlink data.

18. The device according to claim 11, wherein the processor is configured to:

control the transceiver to receive third indicator information sent by the first terminal device, wherein the third indicator information indicates a CQI fed back by the first terminal device, and the CQI fed back by the first terminal device is determined by the first terminal device according to the SINR of the channel; and process, according to the quantity K of the terminal devices, the CQI fed back by the first terminal device, so as to determine the CQI.

19. The device according to claim 18, wherein the processor is configured to:

control the transceiver to receive fourth indicator information sent by the first terminal device, wherein the fourth indicator information indicates a first decoding iteration count, wherein the first decoding iteration count is a count of decoding iterations performed when the first terminal device performs decoding processing on the downlink data; and process, according to the quantity K of the terminal devices and the first decoding iteration count, the CQI fed back by the first terminal device.

* * * * *